United States Patent [19]
Fukui

[11] Patent Number: 5,832,471
[45] Date of Patent: Nov. 3, 1998

[54] METHOD OF AND APPARATUS FOR DISPLAYING LIST OF FILES AND EXECUTING A PROGRAM

[75] Inventor: Toshihiro Fukui, Shizuoka, Japan

[73] Assignee: Fujitsu Limited, Kawasaki, Japan

[21] Appl. No.: 651,657

[22] Filed: May 21, 1996

Related U.S. Application Data

[63] Continuation of Ser. No. 327,849, Oct. 21, 1994, abandoned.

[30] Foreign Application Priority Data

Nov. 5, 1993  [JP]  Japan .................................. 5-276823

[51] Int. Cl.⁶ ...................................................... G06F 17/30
[52] U.S. Cl. .................................. 707/1; 707/4; 707/102; 345/340; 345/348; 345/352
[58] Field of Search ..................................... 395/600, 601, 395/611, 616, 425; 391/500; 707/1, 4, 102; 345/340, 348, 352

[56] References Cited

U.S. PATENT DOCUMENTS

| | | | |
|---|---|---|---|
| 4,611,298 | 9/1986 | Schuldt | 395/600 |
| 5,303,361 | 4/1994 | Colwell et al. | 395/425 |
| 5,312,478 | 5/1994 | Reed et al. | 395/148 |
| 5,535,375 | 7/1996 | Eshel et al. | 391/500 |

OTHER PUBLICATIONS

Alan Simpson, "Mastering Word Perfect 5.1 & 5.2 for Windows", Sybex, Jan. 1992, pp. 406–447.
User Manual "Microsoft Window Ver. 3.1", CMOS, Jan. 1992, pp. 91–137.

*Primary Examiner*—Thomas G. Black
*Assistant Examiner*—Cheryl Renea Lewis

[57] ABSTRACT

The present invention relates to a method and an apparatus for displaying a list of files, selecting one of the files, and executing a program. The present invention displays a list of file names according to a selected title without specifying a directory. The present invention provides a program execution method that allows an executable program to be optionally combined with a file to be handled or executed by the program. The present invention provides a method of displaying items and relationships among the items in a window on a display, to visually guide a user in selecting an executable program and a file to be handled or executed by the program. The method or apparatus displays a list of titles in a first window A according to file list records. When a user selects one of the titles in the first window A, the method or apparatus displays a list of file names in a second window B according to one of the file list records corresponding to the selected title. The method or apparatus displays registered items and relationships among the items in a window. When the user selects one of the items, the method or apparatus specifies file list data and program execution data in an item record corresponding to the selected item. When the user selects a file in a list of file names, the method or apparatus automatically executes a program specified by the program execution data with the selected file as a parameter.

10 Claims, 29 Drawing Sheets

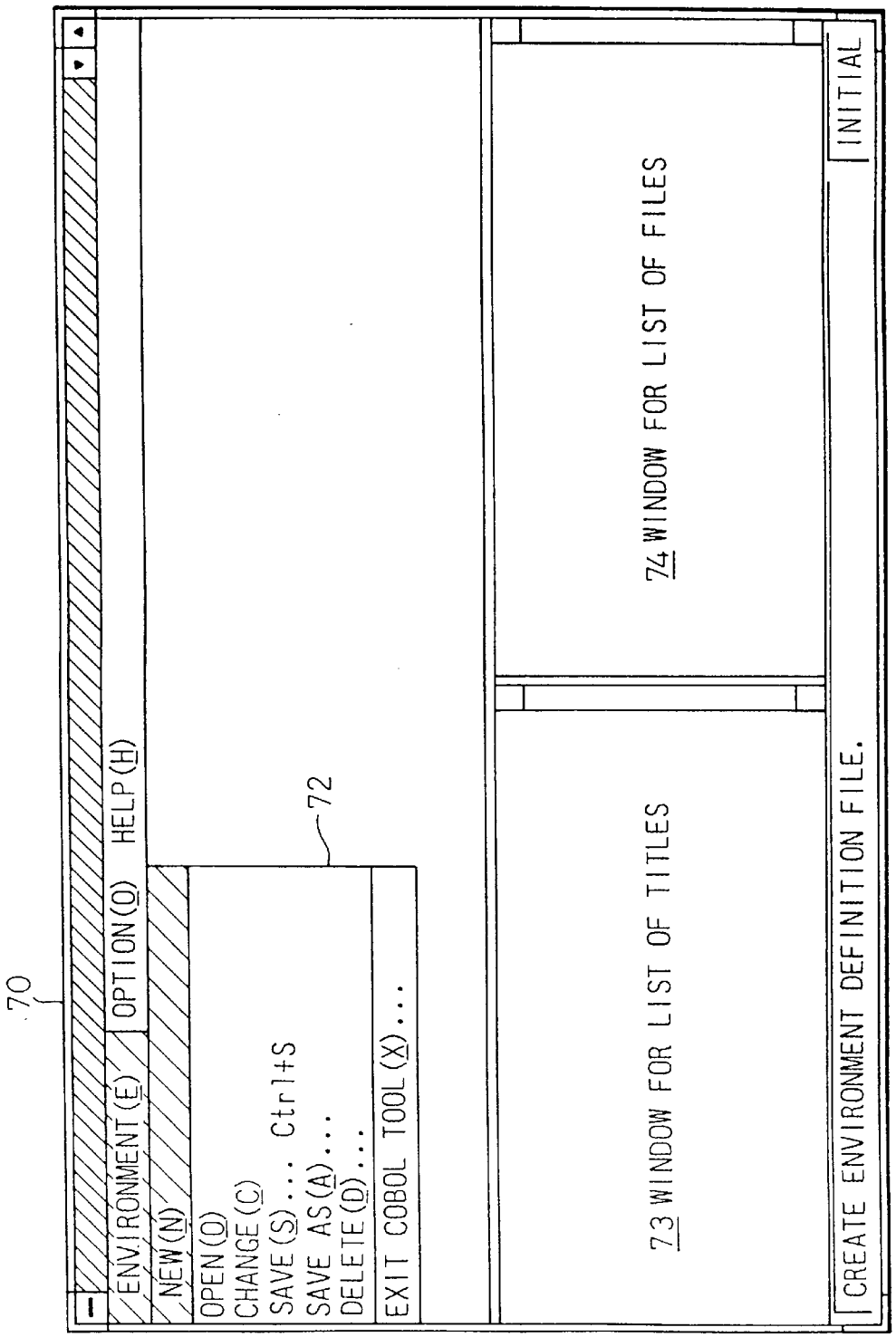

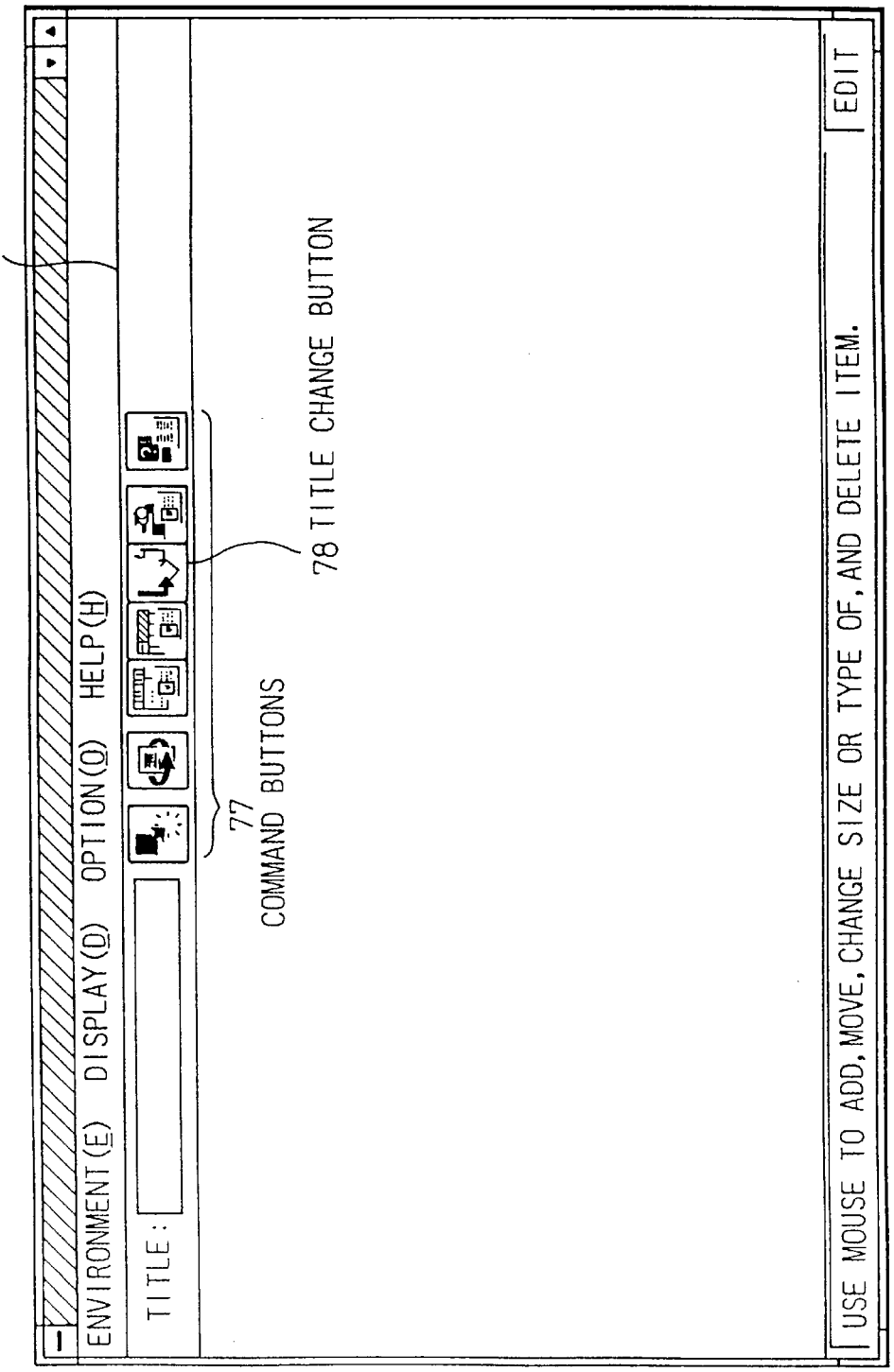

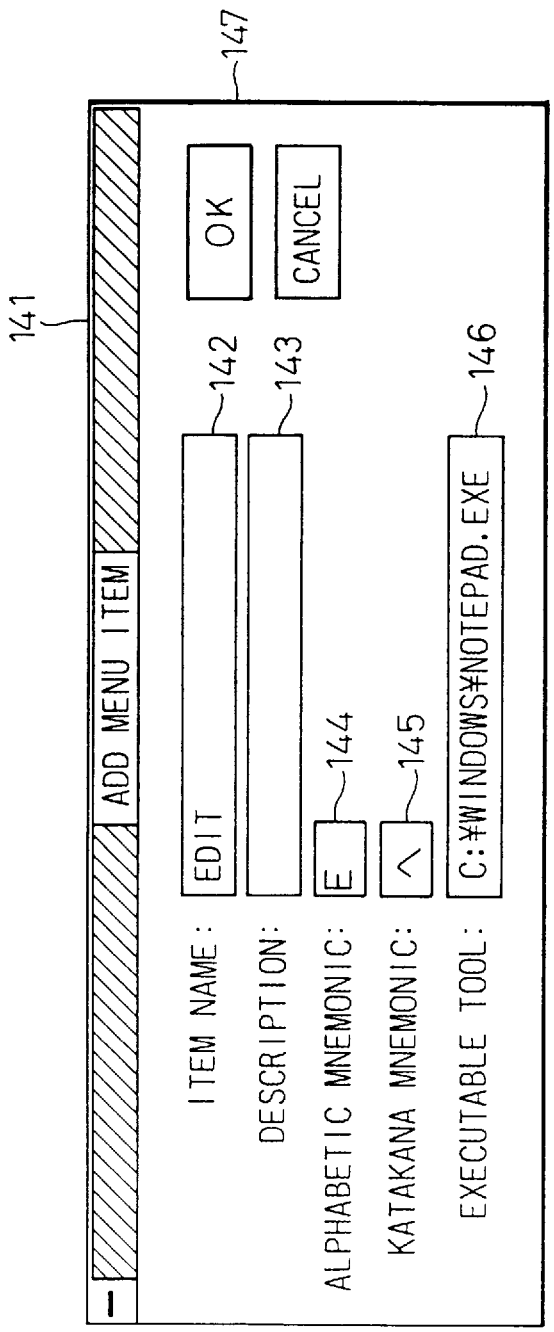

Fig.26A

| DISPLAY ORDER | TITLE | DIRECTORY NAME | EXTENSION |
|---|---|---|---|
| | | | |
| | | | |
| | | | |
| | | | |

32 — TITLE DATA
33 — FILE LIST DATA

Fig.26B

| DISPLAY ORDER | TITLE | DIRECTORY NAME | EXTENSION |
|---|---|---|---|
| 1 | LIST OF SOURCE FILES | C:\MASTER\TEST\SOURCE | COB |
| 2 | LIST OF EXECUTABLE FILES | C:\MASTER\TEST\LOAD | EXE |
| 3 | LIST OF DATA FILES | C:\MASTER\TEST\DATA | DAT |

Fig.27A

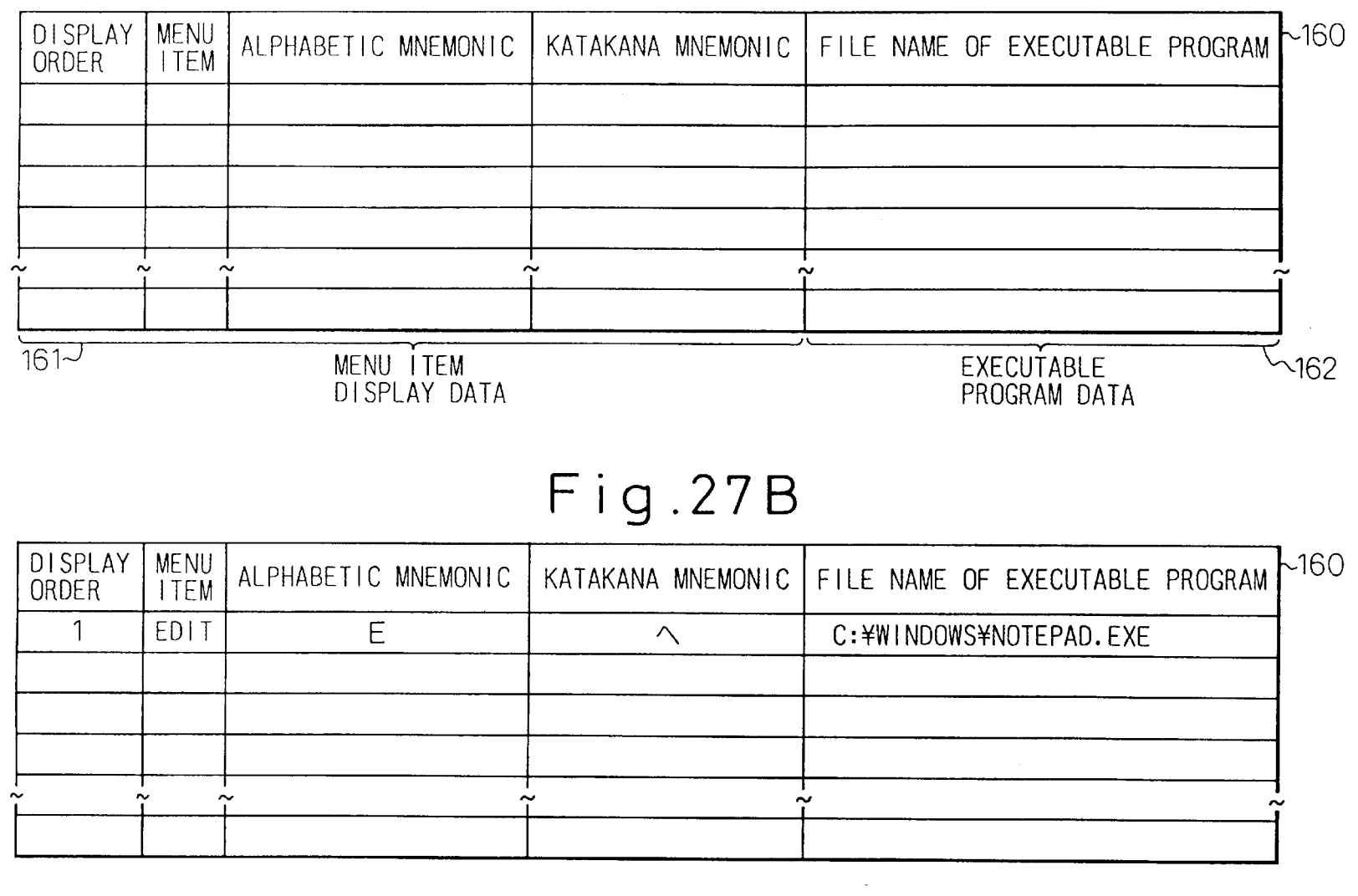

| DISPLAY ORDER | MENU ITEM | ALPHABETIC MNEMONIC | KATAKANA MNEMONIC | FILE NAME OF EXECUTABLE PROGRAM |
|---|---|---|---|---|
|  |  |  |  |  |

- 161: MENU ITEM DISPLAY DATA
- 162: EXECUTABLE PROGRAM DATA

Fig.27B

| DISPLAY ORDER | MENU ITEM | ALPHABETIC MNEMONIC | KATAKANA MNEMONIC | FILE NAME OF EXECUTABLE PROGRAM |
|---|---|---|---|---|
| 1 | EDIT | E | ＜ | C:¥WINDOWS¥NOTEPAD.EXE |

Fig. 28A

| WORK ITEM | COORDINATES | WIDTH | HEIGHT | | | |
|---|---|---|---|---|---|---|

WORK ITEM DISPLAY DATA

| | | | | ATTRIBUTE | DISPLAY ORDER OF FILE LIST RECORDS | FILE NAME OF EXECUTABLE PROGRAM |
|---|---|---|---|---|---|---|

FILE LIST LINK DATA 172　　EXECUTABLE PROGRAM DATA 173

Fig. 28B

| WORK ITEM | COORDINATES | WIDTH | HEIGHT | ATTRIBUTE | DISPLAY ORDER OF FILE LIST RECORDS | FILE NAME OF EXECUTABLE PROGRAM |
|---|---|---|---|---|---|---|
| CREATE PROGRAM | 10,10 | 50 | 10 | RECTANGLE | 1 | C:¥WINDOWS¥NOTEPAD.EXE |
| COMPILE AND LINK PROGRAM | 70,10 | 70 | 10 | RECTANGLE | 1 | C:¥COMPILE¥CC.EXE |
| PREPARE INPUT DATA | 160,10 | 50 | 10 | RECTANGLE | 2 | C:¥WINDOWS¥NOTEPAD.EXE |
| EXECUTE PROGRAM | 70,30 | 70 | 10 | RECTANGLE | 3 | C:¥COMMAND¥PROCESS.EXE |
| | 60,15 | 10 | 0 | ARROW A | | |
| | 140,15 | 20 | 0 | ARROW A | | |
| | 140,35 | 20 | -20 | ARROW A | | |

METHOD OF AND APPARATUS FOR DISPLAYING LIST OF FILES AND EXECUTING A PROGRAM

This application is a continuation of application Ser. No. 08/327,849, filed Oct. 21, 1994, now abandoned.

BACKGROUND OF THE INVENTION

1. Field of the Invention

The present invention relates to a method of and an apparatus for displaying a list of files, selecting one of the files, and executing a program with simple operations.

2. Description of the Related Art

Workstations and personal computers widely employ UNIX (a trade name of Unix System Laboratories, Inc.) and MS-DOS (a trade name of Microsoft Corp.) as an operating system. These operating systems employ a hierarchical file system using special files called directories to control or access many usual files.

Software called a file manager displays a list of files available to a user. The file manager displays a hierarchical structure of directories and displays a list of files, which are accessed by one of the directories selected by the user.

There is a method to easily start a program. This method registers program execution data for each program and executes the program according to the registered program execution data. This method is employed by, for example, a program manager of Microsoft Windows (a trade name of Microsoft Corp.). This program manager includes a file name of the program execution data so that a program to be executed may handle or execute the file name. The program execution data may include a specific part of the file name such as an extension.

A hierarchy of directories of the conventional file system may have an optional depth. As the depth becomes deeper, it becomes more difficult to find a directory that controls or accesses a required file.

Although the conventional method of executing a program, according to registered program execution data, is capable of specifying a file to be handled or executed by the program, the conventional method can not dynamically change the file. Accordingly, it is necessary to register new file data to permit the program to handle another file.

The conventional method of executing a program according to a specific part of file names includes only one file extension in the program execution data.

SUMMARY OF THE INVENTION

An object of the present invention is to easily display a list of file names according to an optional title without specifying a directory.

Another object of the present invention is to provide a program execution method that allows an executable program to be optionally combined with a file to be handled or executed by the program.

Still another object of the present invention is to provide a method of displaying items and relationships among the items in a window on a display, to visually guide a user to procedures of selecting an executable program and a file to be handled or executed by the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute part of the specification, illustrate embodiments of the invention and together with the description, serve to explain the principles of the invention.

FIG. 4 shows a menu ENVIRONMENT (E) in an initial screen.

FIG. 5 shows an edit screen.

FIG. 15 shows a window for adding a menu item.

FIGS. 26A and 26B show file list tables.

FIGS. 27A and 27B show menu item tables.

FIGS. 28A and 28B show work item tables.

DESCRIPTION OF THE PREFERRED EMBODIMENTS

Figure 1A:
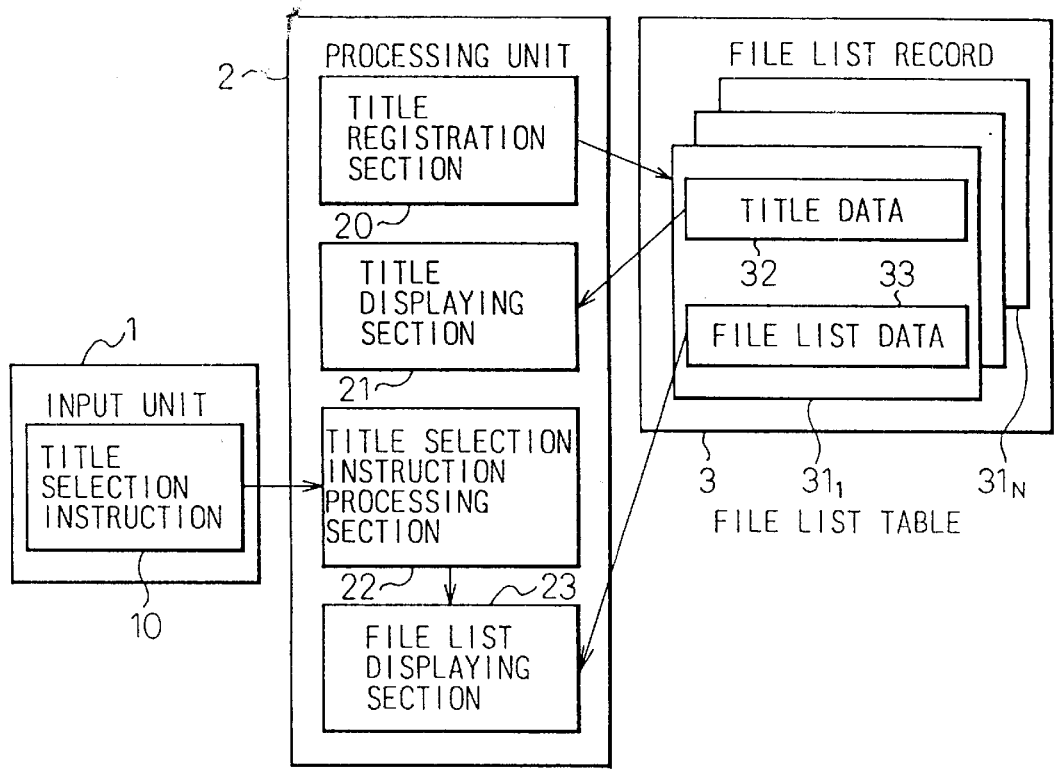
FIGS. 1A and 1B show apparatuses for displaying a list of files according to the present invention.
Figure 1B:
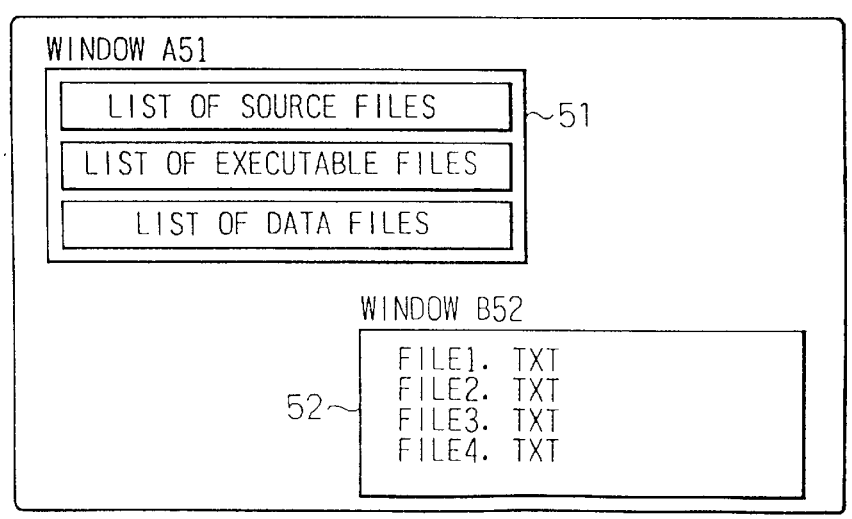

FIGS. 1A and 1B show apparatuses for processing and displaying a list of files according to the present invention.

FIG. 1A shows file list records $31_1$–$31_N$. Titles are read out of the file list records $31_1$–$31_N$ and are displayed in a first window A51 on a display. When a user selects one of the titles in the first window A51, one of the file list records $31_1$–$31_N$ having the selected title is retrieved, and a list of file names is displayed in a second window B52 according to the retrieved file list record. Further, when a user selects one of the titles displayed in the window, the list of file names is displayed according to conditions related to the selected title, with no regard to directories.

In FIG. 1A, the apparatus includes an input unit 1, a title selection instruction 10, a processing unit 2, a title registration section 20, a title displaying section 21, a title selection instruction processing section 22, a file list displaying section 23, a file list table 3, file list records $31_1$–$31_N$, title data 32, and file list data 33. FIG. 1B shows a display screen of the system of FIG. 1A. The display screen includes a window A51 for displaying a list of titles and a window B52 for displaying a list of file names corresponding to selected file list data 33.

The input unit 1 is used to enter various instructions such as the title selection instruction 10. The title selection instruction 10 is entered through a keyboard or a mouse (see FIG. 3), to select one of the titles displayed in the window A51.

The title registration section 20 of the processing unit 2 prepares, for example, a file list record $31_1$, adds title data 32 to the file list record $31_1$ so that the title data 32 is displayed in the window A51, and registers the file list record $31_1$ in the file list table 3. If the system has the file list table 3 in advance, the title registration section 20 may be omitted.

The title displaying section 21 of the processing unit 2 accesses the file list table 3 and displays a list of titles in the window A51 according to the title data 32 of each of the file list records $31_1$–$31_N$.

The title selection instruction processing section 22 of the processing unit 2 selects one of the titles in the file list table 3 according to the title selection instruction 10, specifies one of the file list records $31_1$–$31_N$ corresponding to the selected title, and requests the file list displaying section 23 to display a list of file names in accordance with the file list data 33.

The file list displaying section 23 accesses the file list data 33 of the file list record $31_1$, for example, specified by the title selection instruction processing section 22, extracts file names according to conditions in the file list data 33, and displays the extracted file names in the window B52.

The file list table 3 stores the file list records each containing the title data 32 and file list data 33. The title data 32 are a string of characters representing a title, and the file list data 33 are conditions such as a directory name and a file extension to specify file names to be displayed.

The apparatus of FIG. 1A basically functions in the following manner. The title displaying section 21 displays titles in the window A51 on the display according to the file list records $31_1$–$31_N$. In FIG. 1B, the titles displayed are LIST OF SOURCE FILES, LIST OF EXECUTABLE FILES, and LIST OF DATA FILES. If the title selection instruction 10 entered through the input unit 1 specifies the LIST OF SOURCE FILES, for example, the title selection instruction processing section 22 accesses the file list table 3 and specifies one of the file list records $31_1$–$31_N$ having the title of LIST OF SOURCE FILES, such as file list record $31_1$. The file list displaying section 23 extracts file names according to conditions in the specified file list record $31_1$ and displays the extracted file names in the window B52.

Figure 2A:
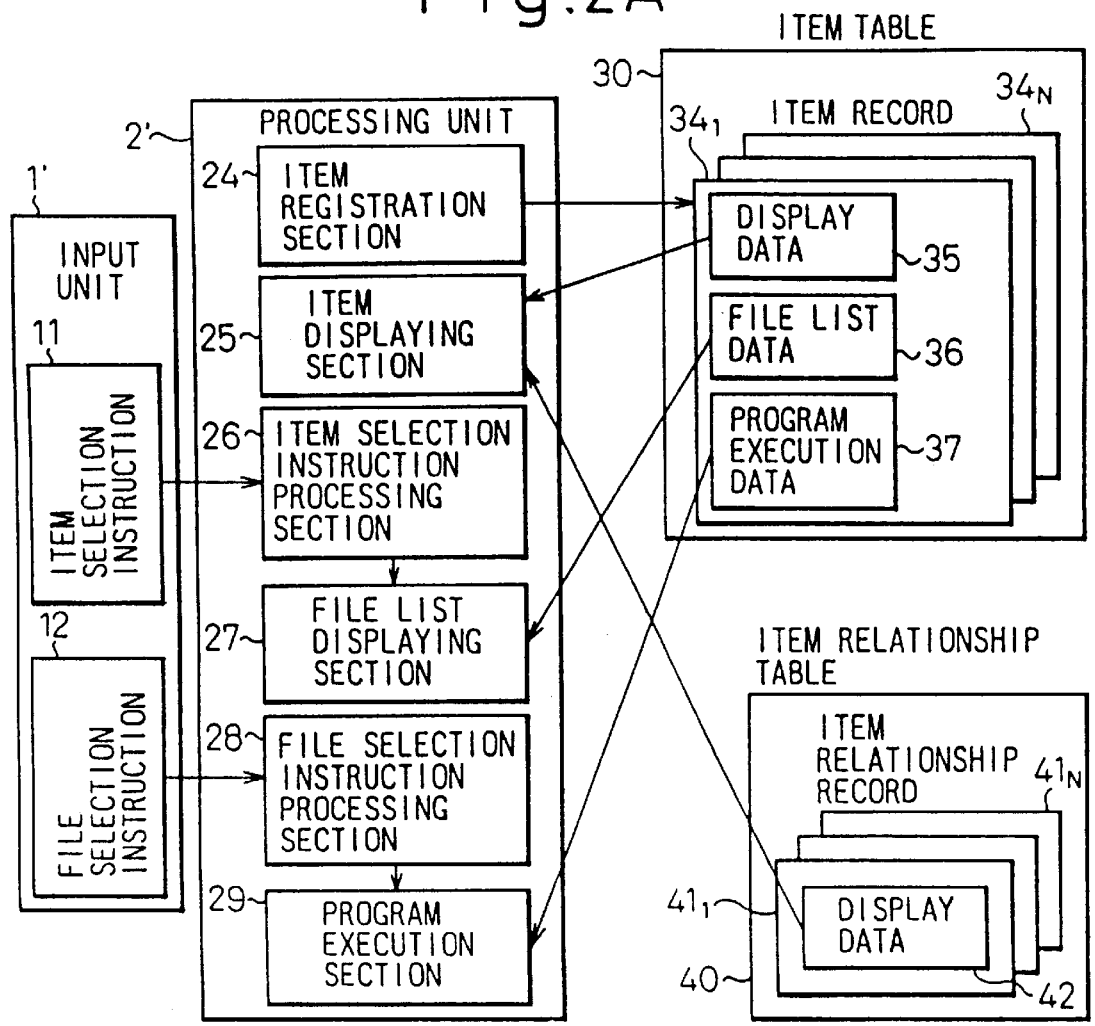
FIGS. 2A and 2B show apparatuses for executing a program according to the present invention.

FIG. 2A shows an apparatus for executing and processing a program according to the present invention. According to the invention of FIG. 2B, a user selects one of the items in the window. Then, a list of file names is displayed. When the user selects one of the files in the window, a program corresponding to the selected item is combined with the selected file and is executed.

More specifically in FIG. 2A, each item record $34_1$–$34_N$ contains display data 35, file list data 36 and program execution data 37. Each item relationship record $41_1$–$41_N$ contains relationships among items. The items and relationships are retrieved from the item records $34_1$–$34_N$ and item relationship records $41_1$–$41_N$ and are displayed in a first window C53. Four items are shown as an example, but N items may be displayed. When a user selects one of the items in the first window C53, a corresponding item record $34_1$, for example, is retrieved to specify the display data 35, the file list data 36 and program execution data 37.

According to the specified file list data 36, a list of file names is displayed in a second window D54. When the user selects one of the file names in the second window 54, the selected file name is combined with the specified program execution data 37, and a program is executed according to the program execution data 37.

In FIG. 2A, the apparatus includes an input unit 1' for inputting an item selection instruction 11 and a file selection instruction 12, a processing unit 2', an item registration section 24, an item displaying section 25, an item selection instruction processing section 26, a file list displaying section 27, a file selection instruction processing section 28, a program execution section 29, an item table 30, item records $34_1$–$34_N$, display data 35, file list data 36, program execution data 37, an item relationship table 40, item relationship records $41_1$–$41_N$, and display data 42.

Figure 2B:
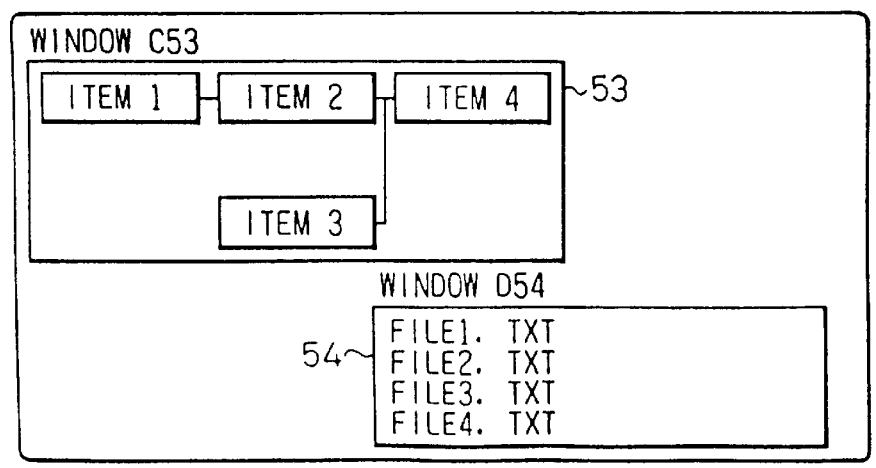

FIG. 2B shows a display screen of the system of FIG. 2A. The screen includes a window C53 for displaying items and relationships among the items and a window D54 for displaying a list of file names.

The input unit 1' is used to enter instructions such as the item selection instruction 11 and file selection instruction 12.

The item registration section 24 prepares an item record $34_1$ for example, adds display data 35 such as an item name, which is to be displayed in the window C53, to the item record $34_1$ for example, and registers the item record $34_1$ for example, in the item table 30. An item relationship record $41_1$ for example, is registered in the item relationship table 40 as and when required. If the system has the item table 30 in advance, the item registration section 24 may be omitted.

The item displaying section 25 accesses the item table 30 and displays items in the window C53 according to the display data 35 of each item records $34_1$–$34_N$. The item displaying section 25 also accesses the item relationship table 40 and displays relationships among the items in the window C53 according to the display data 42 of each item relationship records $41_1$–$41_N$.

The item selection instruction processing section 26 specifies one of the item records $34_1$–$34_N$ in the item table 30 according to the item selection instruction 11 and requests the file list displaying section 27 to display a list of file names.

The file list displaying section 27 accesses the file list data 36 of the item record $34_1$ specified by the item selection instruction processing section 26, extracts file names according to conditions contained in the file list data 36, and displays the extracted file names in the window D54.

The file selection instruction processing section 28 selects a file name according to the file selection instruction 12 and requests the program execution section 29 to execute a program. The program execution section 29 accesses the program execution data 37 of the item record $34_1$, for example, specified by the item selection instruction processing section 26, combines the selected file name with the specified program execution data 37, and executes the program.

The item table 30 stores the item records $34_1$–$34_N$ each containing the display data 35, file list data 36, and program execution data 37. The display data 35 contain an item to be displayed and the coordinates and size of the item. The file list data 36 contain conditions such as a directory that controls or accesses required files and a file extension to specify files to be displayed. The program execution data 37 contain a program name, a directory that controls the program, etc.

The item relationship table 40 stores the item relationship records $41_1$–$41_N$ each containing the display data 42. The display data 42 are coordinate data, etc., for displaying relationships among items.

The apparatus of FIG. 2A functions in the following manner. The item displaying section 25 displays items in the window C53 according to the item records $34_1$–$34_N$ registered in the item table 30. If the item relationship records $41_1$–$41_N$ are registered in the item relationship table 40, the relationships among the items are also displayed. In FIG. 2, ITEM 1 to ITEM 4 and their relationships are displayed. However, there may be 1–N items and relationships among 1–N items displayed. If the item selection instruction 11 entered through the input unit 11 specifies the ITEM 2 for example, the item selection-instruction processing section 26 accesses the item table 30 and specifies one of the item records $34_1$–$34_N$ corresponding to the ITEM 2. The file list displaying section 27 displays a list of file names in the window D54 on the display according to the file list data 36 of the specified item record $34_1$ for example.

When the file selection instruction 12 is entered through the input unit 11, the file selection instruction processing section 28 specifies a selected file name and requests the program execution section 29 to execute a program. The program execution section 29 combines the specified file name with the corresponding program execution data 37 and executes the program.

Figure 3A:
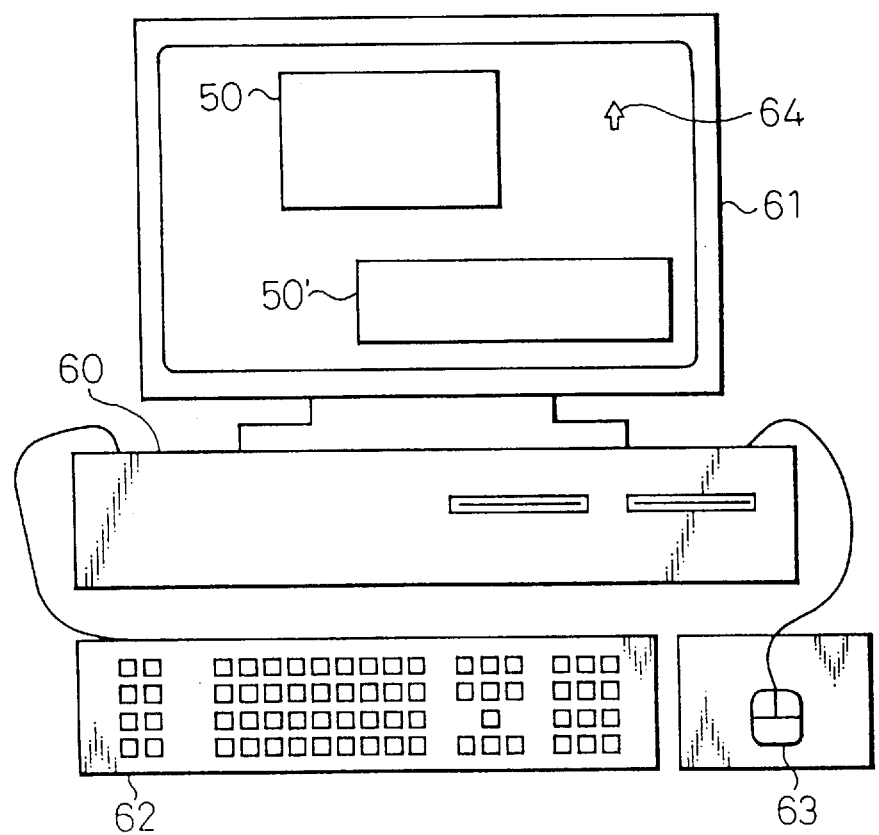
FIGS. 3A and 3B show hardware arrangements according to an embodiment of the present invention.

FIG. 3A shows a hardware arrangement according to an embodiment of the present invention. A computer 60 has a CPU and memories including a ROM and file storage unit, and the computer is connected to a display 61, a keyboard 62, and a mouse 63. The display 61 displays windows 50 and 50', and a cursor 64 for indicating an input position. The display 61 also shows the results of the execution of the program. The present invention is applicable not only to the personal computer of FIG. 3 but also to computers of any kind, particularly if they have a function of displaying windows on a display.

Figure 3B:
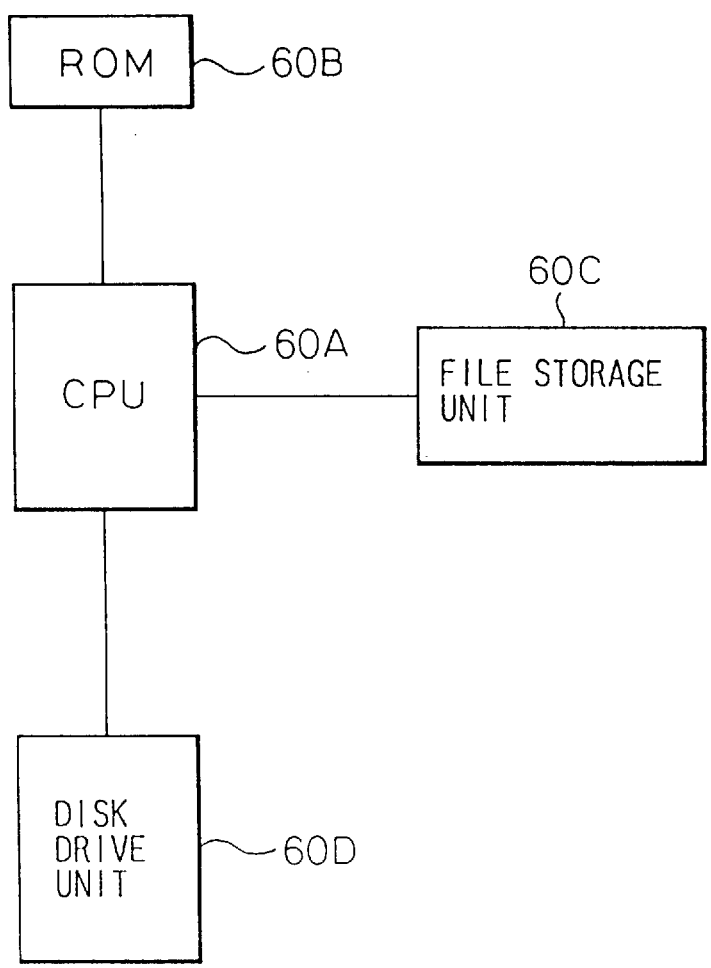

FIG. 3B shows a block diagram including some of the components of the computer 60 including a CPU 60A connected to a ROM 60B, a file storage unit or memory 60C and disk drive unit 60D.

(1) Registering Titles

Operations of the title registration section 20 for registering a new title will be explained next with reference to display screens of FIGS. 4 to 9.

1) FIG. 4 shows an initial screen 70 in which a menu ENVIRONMENT (E) 72 is selected and displayed to create, change, or register data in the file list table 3. A window 73 displays a list of registered titles. A window 74 displays a list of file names corresponding to a selected one of the titles. When NEW (N) is selected in the ENVIRONMENT (E) menu, a title registration process starts, and the initial screen is changed to an edit screen.

2) FIG. 5 shows the edit screen. A window 75 shows command buttons 77 for adding, moving, sizing, changing, and deleting a file list record.

Figure 6:
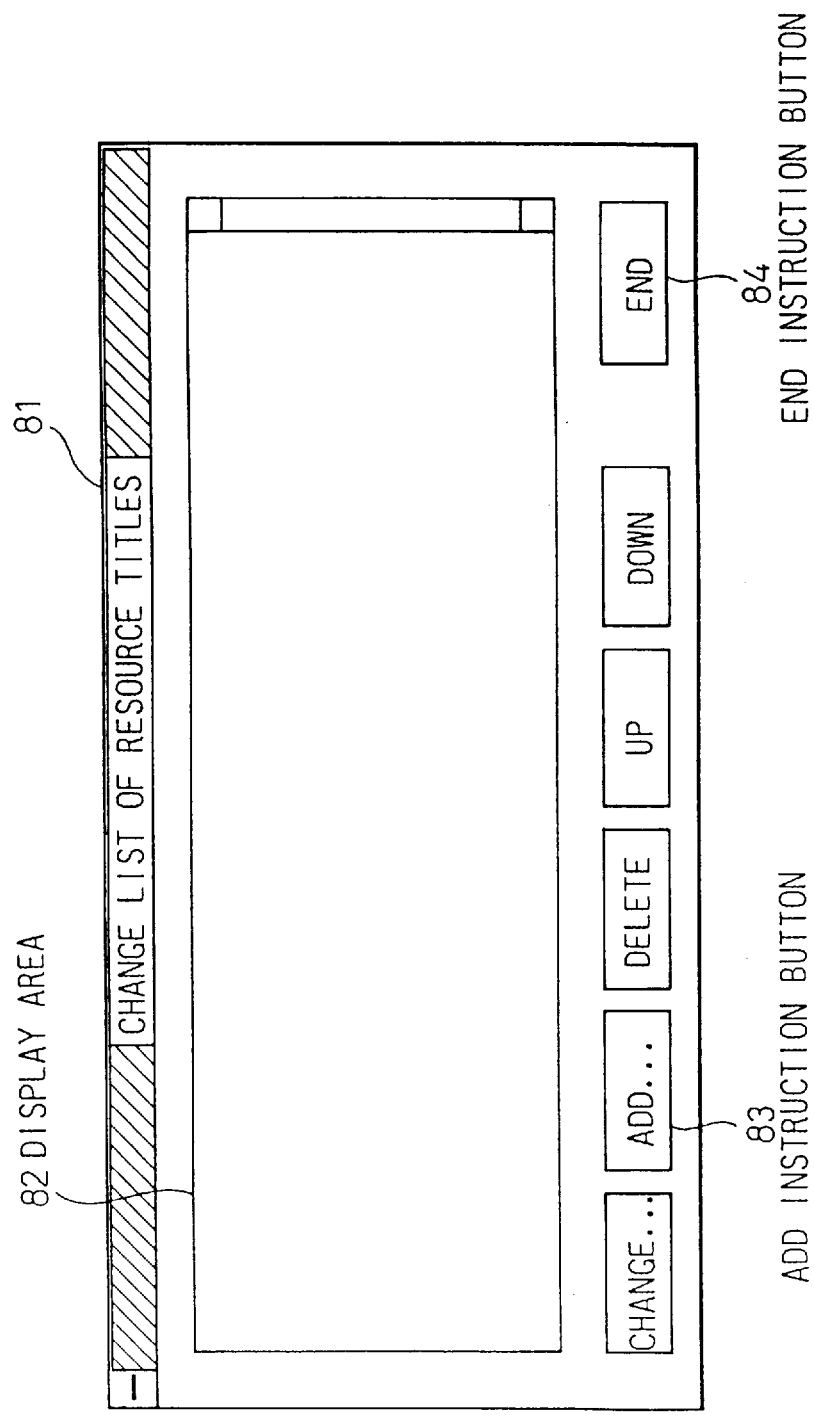
FIG. 6 shows a window for changing resource titles.

3) If the button 78 for changing a title is selected, a window 81 of FIG. 6 for changing a list of resource titles is displayed over the window 75 in the edit screen of FIG. 5. If there are registered file list records, they are all displayed in a display area 82. Since there are no registered file list records in this example, nothing is displayed in the display area 82.

Figure 7:
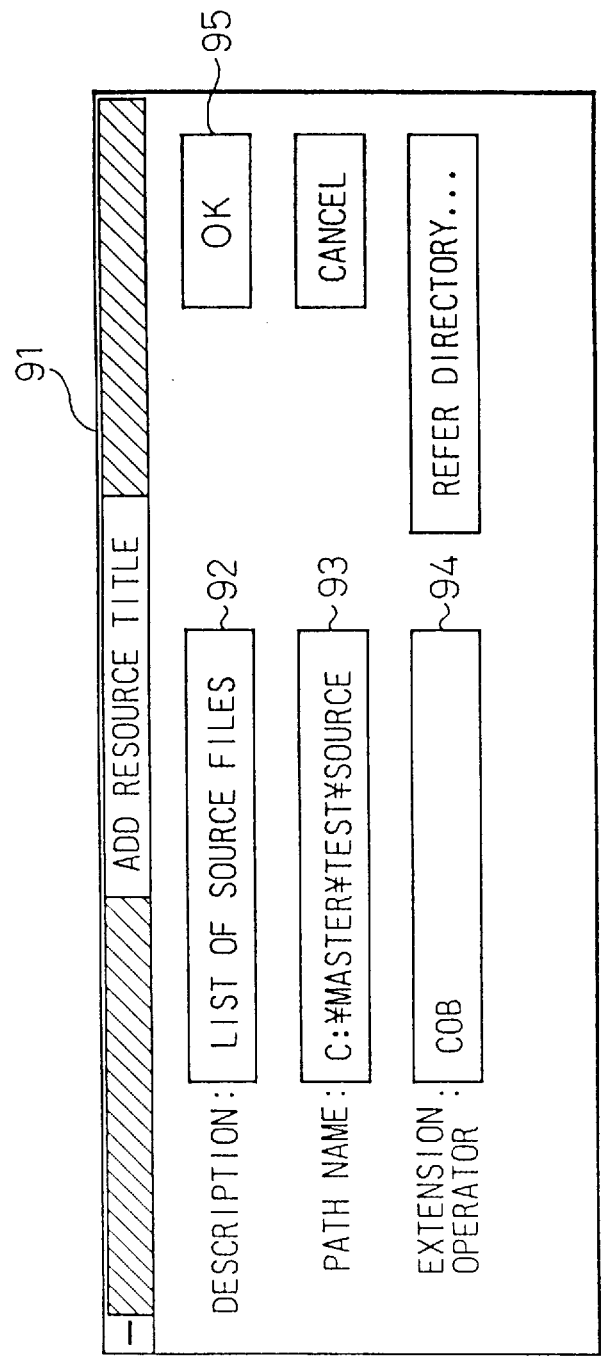
FIG. 7 shows a window for adding a resource title.

4) When an add button 83 of FIG. 6 is selected, a window 91 of FIG. 7 for adding a resource title is displayed.

The window 91 includes an area 92 for entering a string of characters to be displayed as a title, an area 93 for entering a path, i.e., a combination of directory names, an area 94 for entering a file extension, and command buttons. In this example, a character string of LIST OF SOURCE FILES is entered as the title, C:\MASTER\TEST\SOURCE as the path, and COB as the file extension. When a button OK 95 is selected to fix the entered data, the window 91 is closed, and the window 81 of FIG. 6 reappears. The data entered through these processes are registered to the file list table 3 of FIG. 26A to be explained later.

Figure 8:
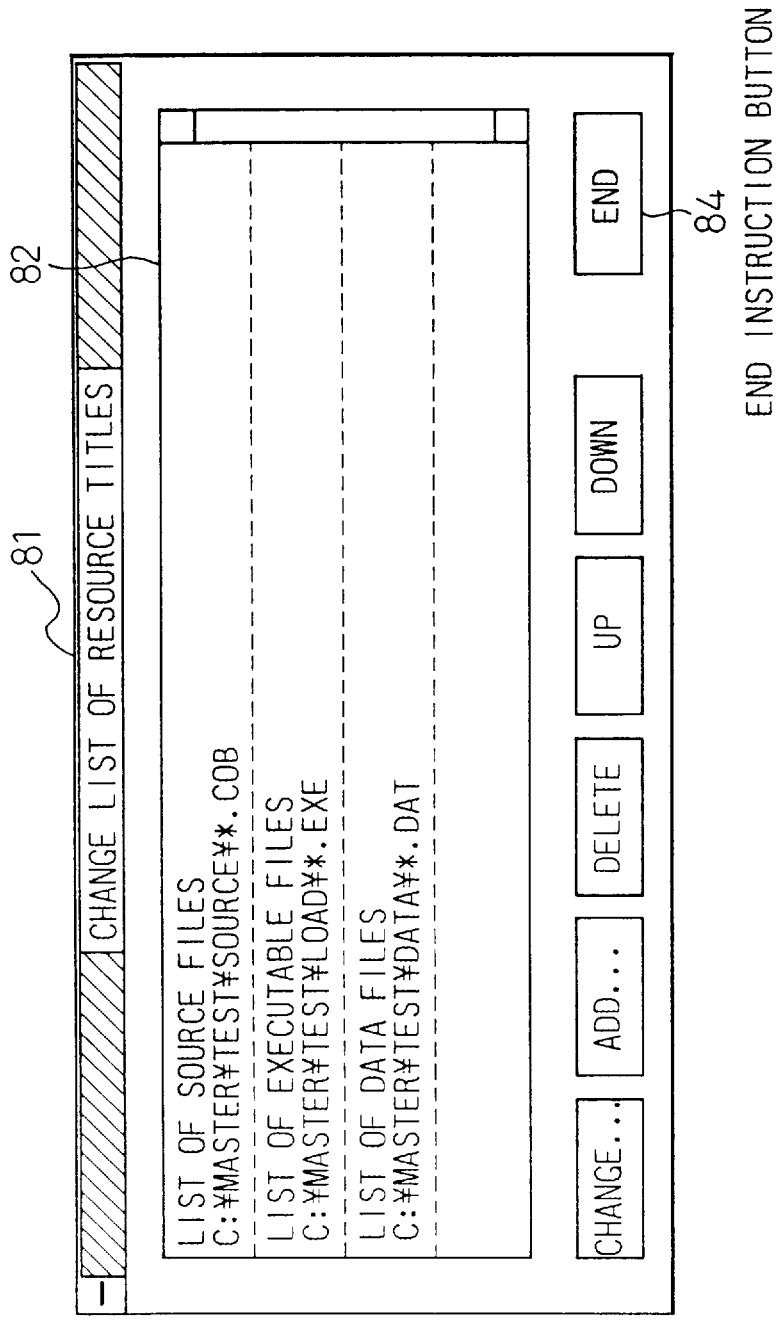
FIG. 8 shows the window for changing resource titles.
Figure 9:
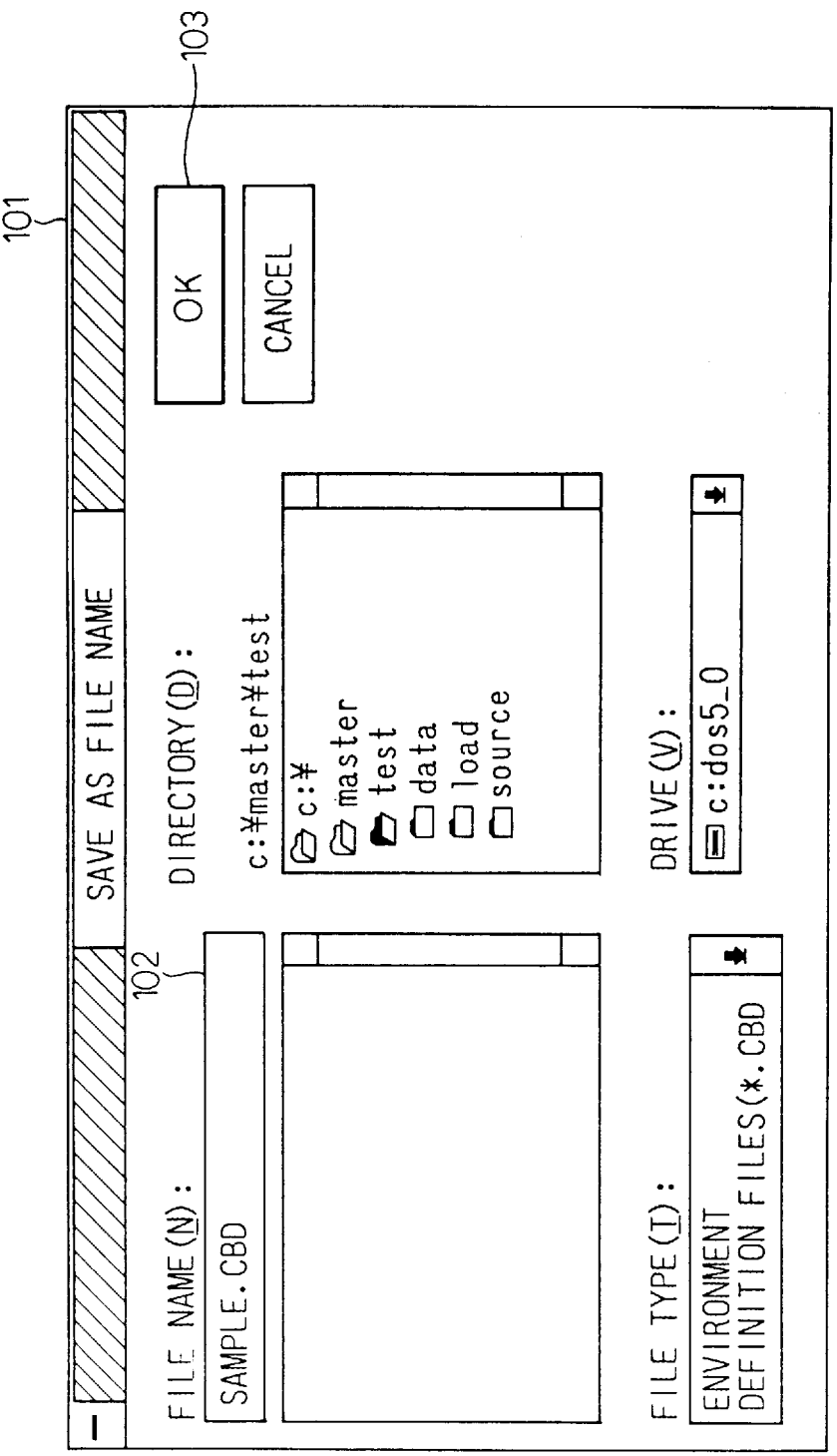
FIG. 9 shows a window for saving a file.

5) The processes 2) to 4) are repeated for the titles LIST OF EXECUTABLE FILES and LIST OF DATA FILES so that the display area 82 in the window 81 for changing the list of resource titles, displays the registered titles, path names, and extensions as shown in FIG. 8. When an end button 84 is selected, the window 81 for changing the list of resource titles is closed, and the window 75 in the edit screen reappears. The file list table 3 of FIG. 26B is prepared in this way.

6) To save registered titles, SAVE (S) is selected in the ENVIRONMENT (E), to change the edit mode to an operation mode. If no file name is specified to save the registered data, a window 101 of FIG. 9 for saving data is displayed. A file name to save the data must be entered in a file name area 102. When an OK button 103 is selected, the registered file list data in the file list table 3 are saved under the entered file name. This completes the title registration process.

(2) Displaying a List of Titles and a List of File Names

Figure 10:
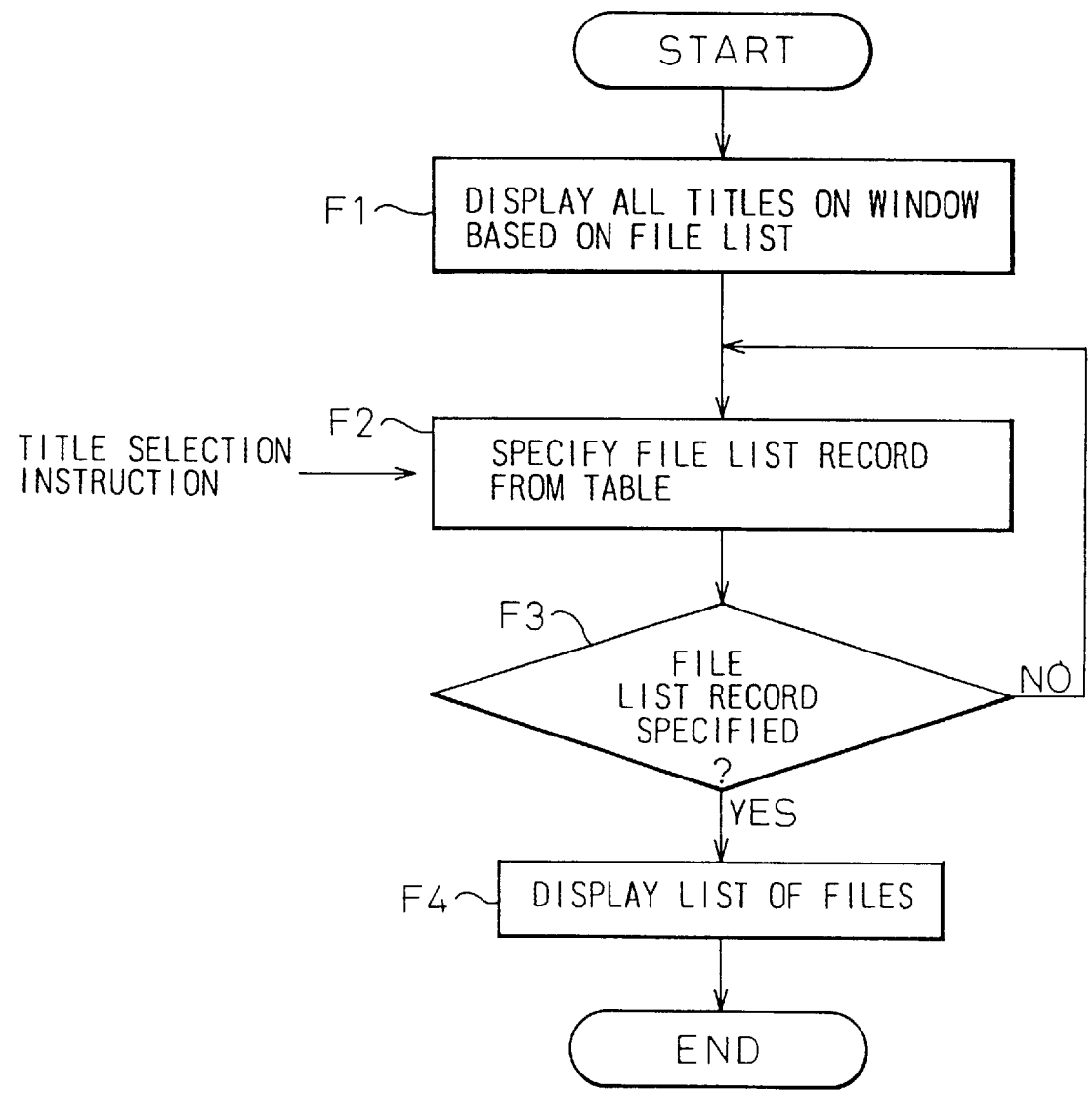
FIG. 10 is a flowchart showing steps of displaying a list of files.
Figure 11:
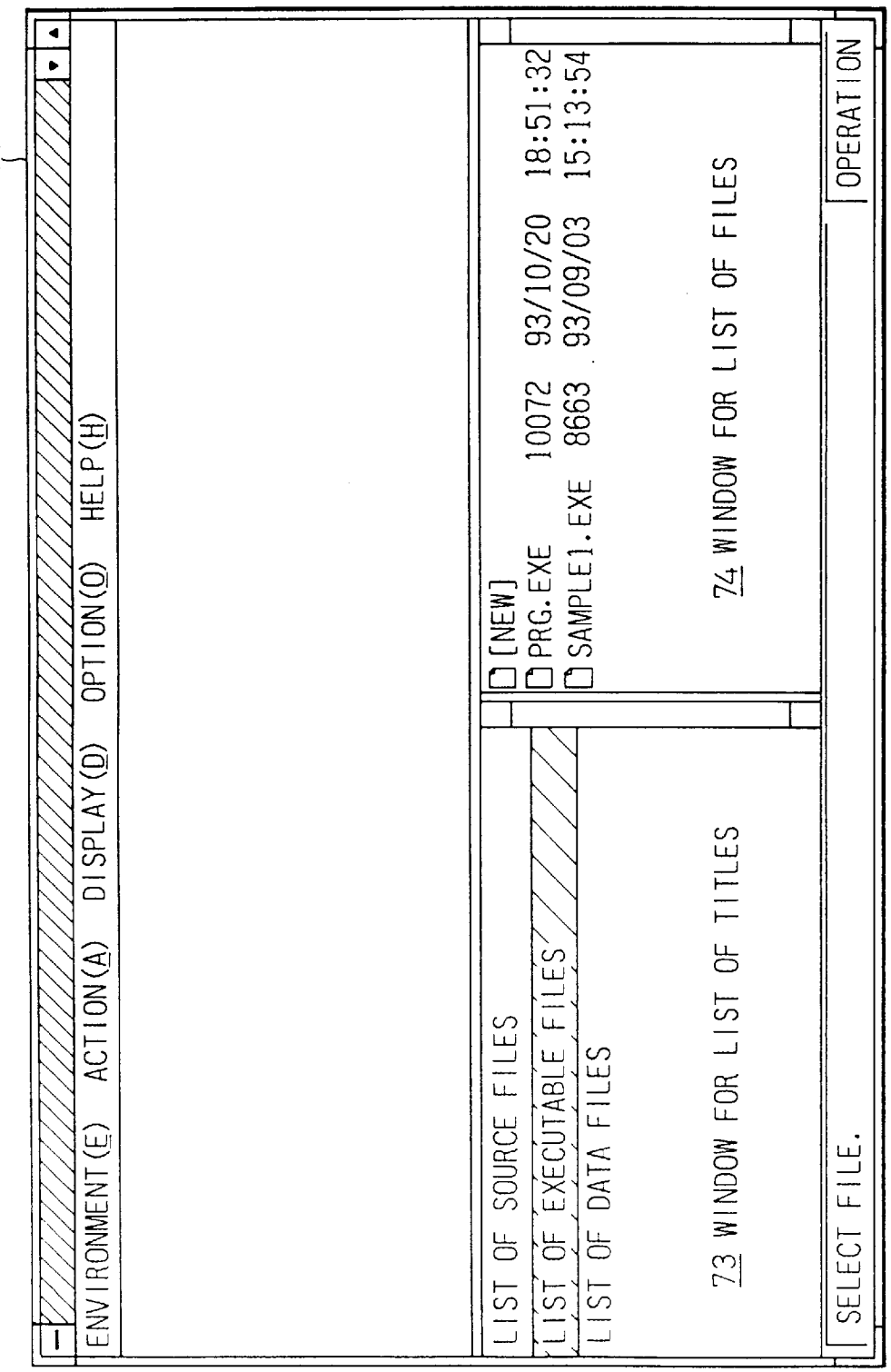
FIG. 11 shows an operation screen displaying a list of titles and a list of file names.

FIGS. 10 and 11 explain displaying a list of files by the title displaying section 21, title selection instruction processing section 22, and file list displaying section 23 according to the file list table 3. FIG. 10 is a flowchart showing steps carried out by the processing unit 2 and FIG. 11 shows an operation screen 71 displaying a list of titles and a list of file names.

Step F1 of FIG. 10 displays titles in the window 73 according to the title data 32 of every file list record $31_1$–$31_N$ in the file list table 3. The example of FIG. 11 shows titles LIST OF SOURCE FILES, LIST OF EXECUTABLE FILES, and LIST OF DATA FILES.

Step F2 selects one of the titles according to the title selection instruction 10 and specifies one of the file list records $31_1$–$31_N$ out of the file list table 3 according to the selected title.

Step F3 determines whether or not the corresponding file list record $31_1$, for example, has been specified. If YES, step F4 is carried out, and if NO, the flow returns to the step F2. In FIG. 11, the LIST OF EXECUTABLE FILES is selected and inverted on the display.

The step F4 displays a list of file names, file sizes, last update dates, and last update times in the file list window 74 according to the file list data 33 of the specified file list record $31_1$. At this time, a directory name and a file extension contained in the file list record $31_1$ in the file list table 3 of FIG. 26 are used with a wild card "*" to extract and display all corresponding file names. In FIG. 11, the window 74 displays file names PRG.EXE and SAMPLEL.EXE corresponding to the title LIST OF EXECUTABLE FILES. To specify one of the files in the window 74, the mouse is clicked on the required file. To create a new file, the mouse is clicked on NEW.

(3) Executing a Program According to a List of Files

A file name is selected out of a list of file names, and the selected file name is used as a parameter to execute a program. This will be explained next. Data for a program to be executed are registered in advance as a menu item in a menu ACTION (A). After selecting a file name, a user selects the menu item to run the program with the selected file name as an execution parameter.

FIGS. 12 to 18 are display screens used for adding a menu item for executing a program to do this, menu item data must be registered in a menu item table 160 of FIG. 27 to be explained later.

Figure 12:
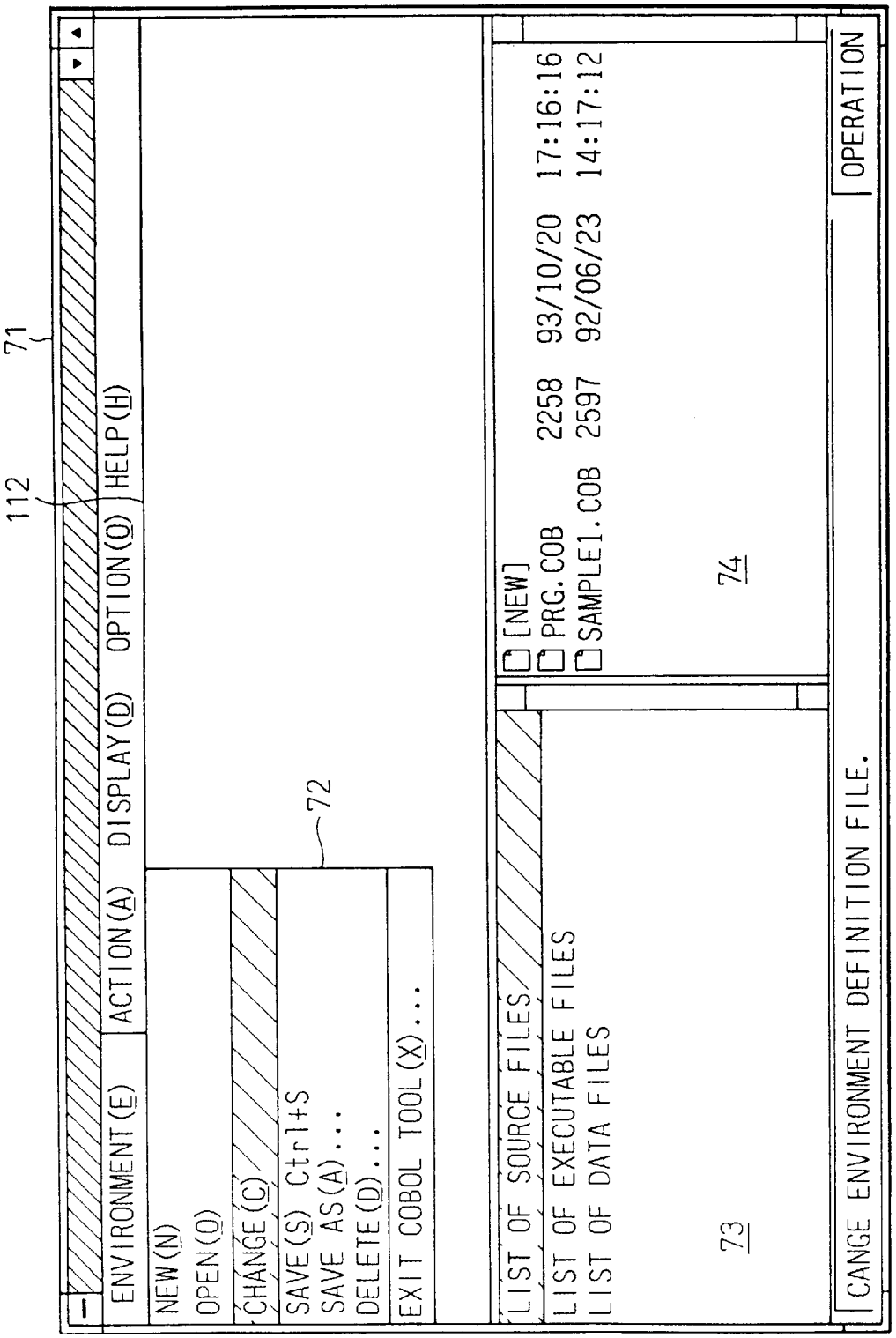
FIG. 12 shows the menu ENVIRONMENT (E) in the operation screen.

1) FIG. 12 shows the menu ENVIRONMENT (E) 72 pulled down in the operation screen 71, to add a program data item. The window 73 displays registered titles. The window 74 displays a list of file names corresponding to a specified one of the titles. A window 112 displays relationships among items. In the figure, the LIST OF SOURCE FILES is selected in the window 73, and file names corresponding to the LIST OF SOURCE FILES are displayed in the window 74. No item is registered so that nothing is displayed in the window 112.

If a user selects CHANGE-(C) in the menu ENVIRONMENT (E) 72, a menu item adding process starts, and the operation mode is changed to the edit mode.

Figure 13:
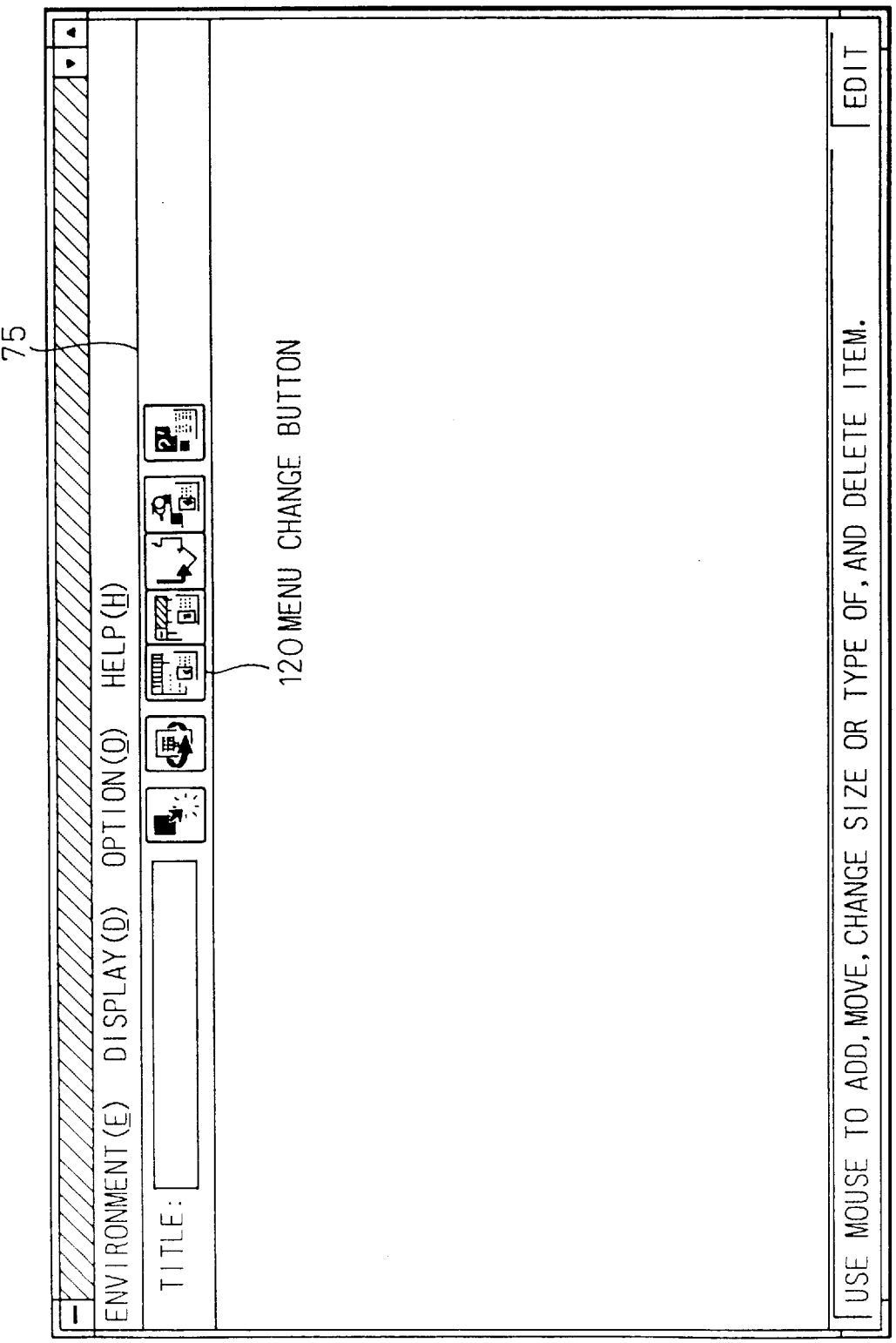
FIG. 13 shows an edit screen.

2) FIG. 13 shows the edit screen. When a menu change button 120 is selected in the window 75 in the edit screen, a window 131 of FIG. 14A for changing a menu is displayed over the window 75 in the edit screen of FIG. 13.

The window 131 has a menu item display area 132, an ADD button 133, and an END button 134. Since no menu item is registered, the area 132 displays nothing.

3) When the ADD button 133 is selected in the window 131, a window 141 of FIG. 15 for adding a menu item is displayed. A menu item name is entered in an item name area 142, a simple description is entered in a description area 143, an alphabetic key is entered as an instruction button in an alphabetic mnemonic area 144, a katakana key is entered as an instruction button in a katakana mnemonic area 145, and a path and a file name to specify a program are entered in an executable tool area 146. An OK button 147 is selected to fix the entered data. The window 141 is closed to end the item adding process, and a menu item record is registered in the menu item table 160 of FIG. 27B.

Figures 14A, 14B:
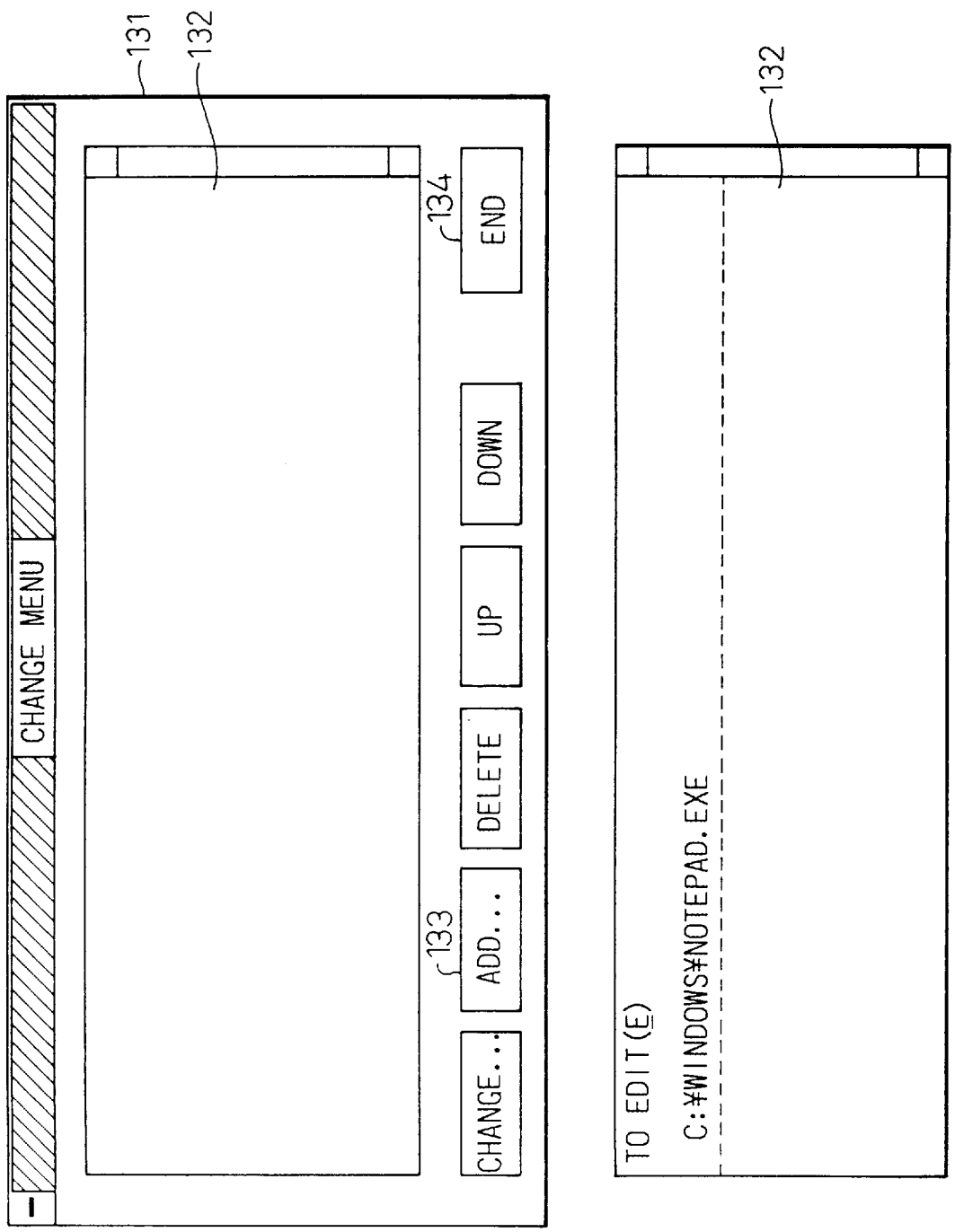
FIGS. 14A and 14B show windows for changing menus.

The menu item display area 132 of FIG. 14B displays the added item, alphabetic mnemonic, katakana mnemonic, and the path and file name of the executable program. These processes may be repeated to add other menu items.

Figure 16:
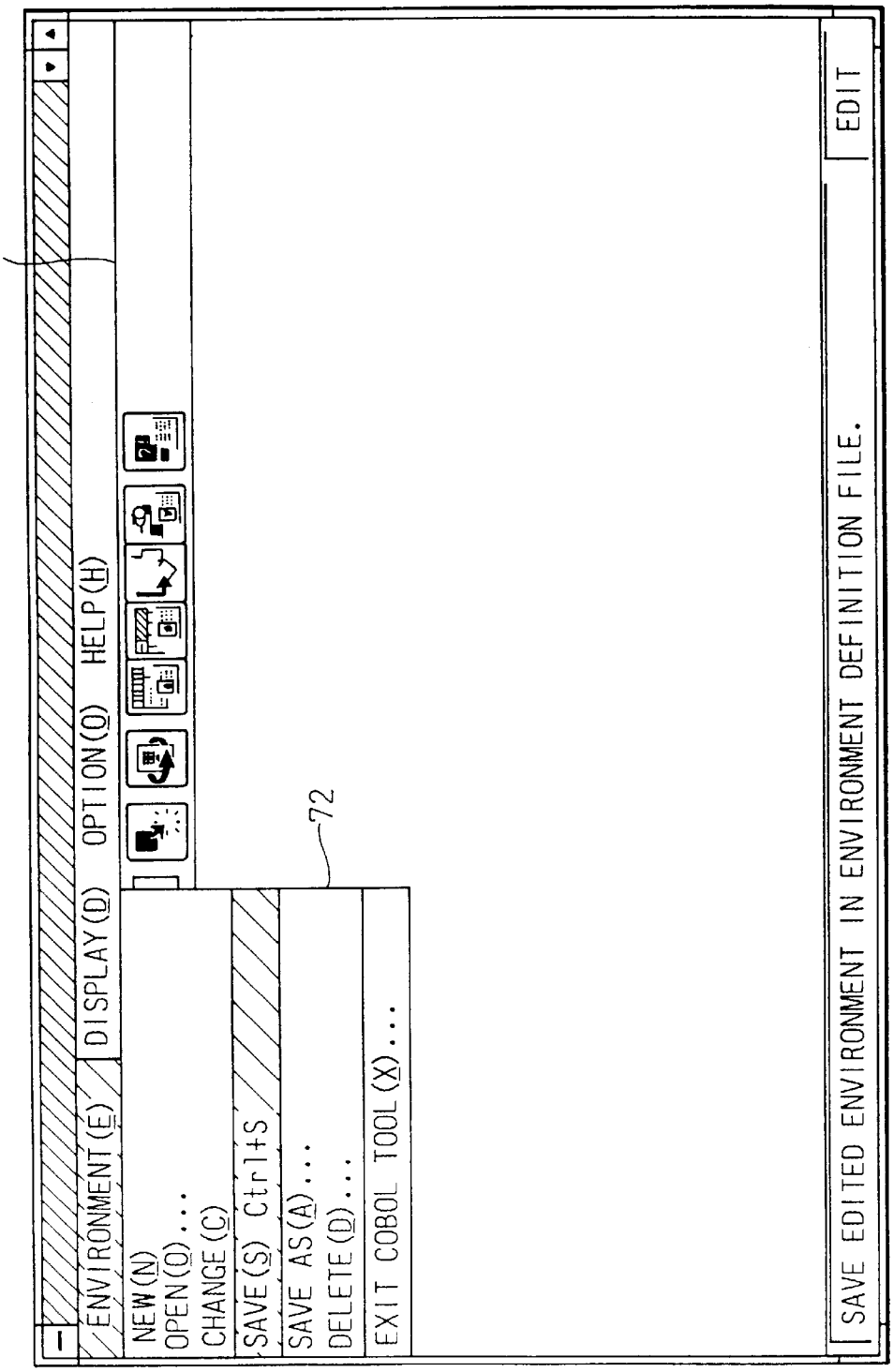
FIG. 16 shows an example of the edit screen.

4) When the END button 134 is selected in the window 131, the window 75 of the edit screen reappears. When SAVE (S) in the menu ENVIRONMENT (E) 72 is selected as shown in FIG. 16, the menu item record registered in the menu item table 160 is saved in a specified file, and the edit mode is changed to the operation mode. As a result, the menu ACTION (A) will have a menu item EDIT (E) 115 as shown in FIG. 17.

5) Using the registered menu item will be explained next. When EDIT (E) is selected in the menu ACTION (A) as shown in FIG. 17, the selected menu item functions as a key to retrieve one of the menu item records out of the menu item table 160 of FIG. 27B. A program file name contained in the executable program data in the retrieved menu item record is combined with a selected file name serving as a parameter, and the program is executed.

Figure 17:
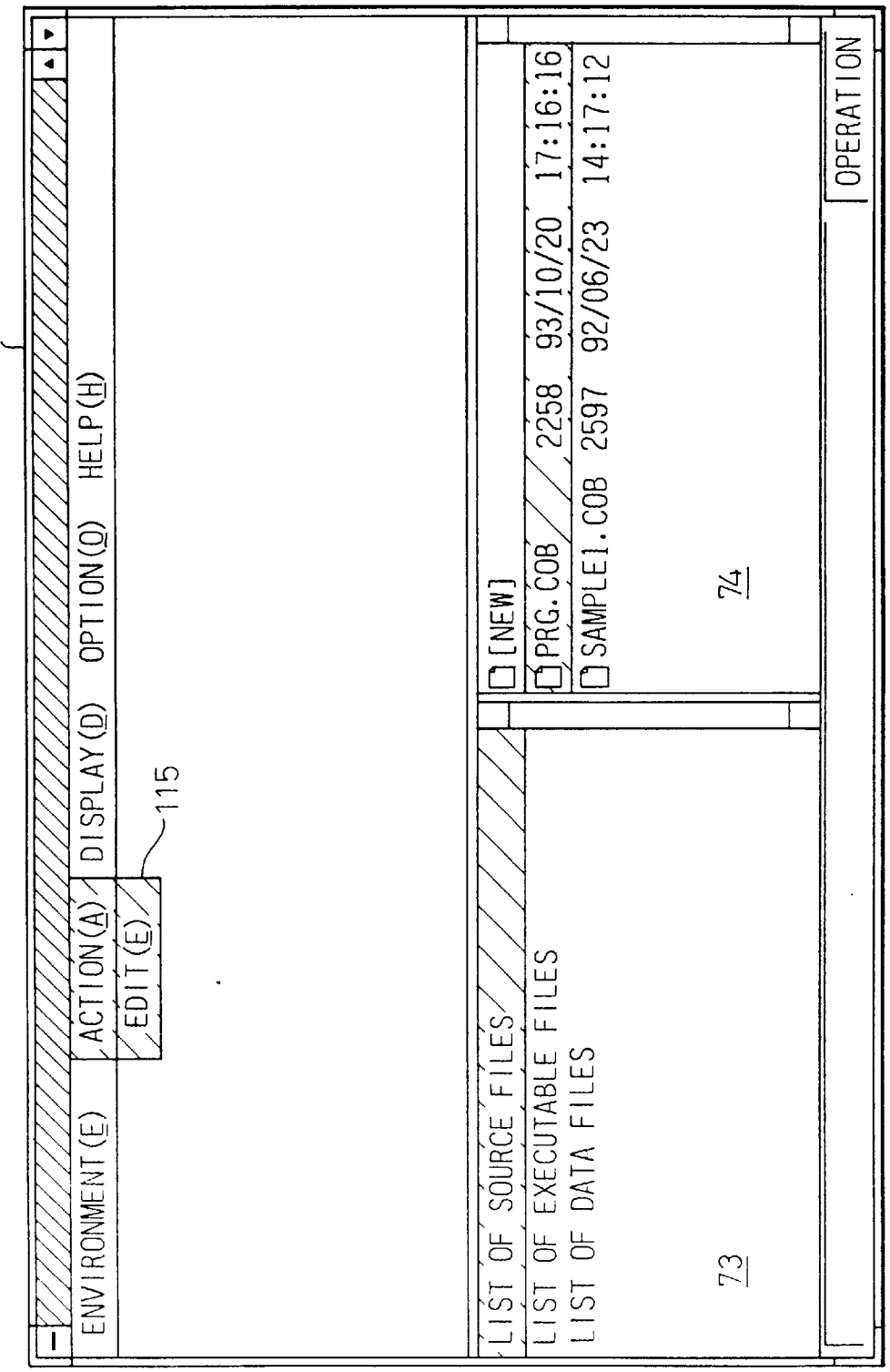
FIG. 17 shows a menu item EDIT (E).

In the FIG. 17, the LIST OF SOURCE FILES is selected in the window 73, and a list of file names corresponding to the selected title is displayed in the window 74. If PRG.COB is selected in the window 74, the file name PRG.COB in a directory C:\MASTER\TEST\SOURCE is specified as an execution parameter for a program having a file name of NOTEPAD.EXE in a directory C:\WINDOWS, and the program is executed. Namely, the following execution request is made to the operating system:

C:\WINDOWS\NOTEPAD.EXE C:\MASTER\TEST\SOURCE\PRG.COB

Figure 18:
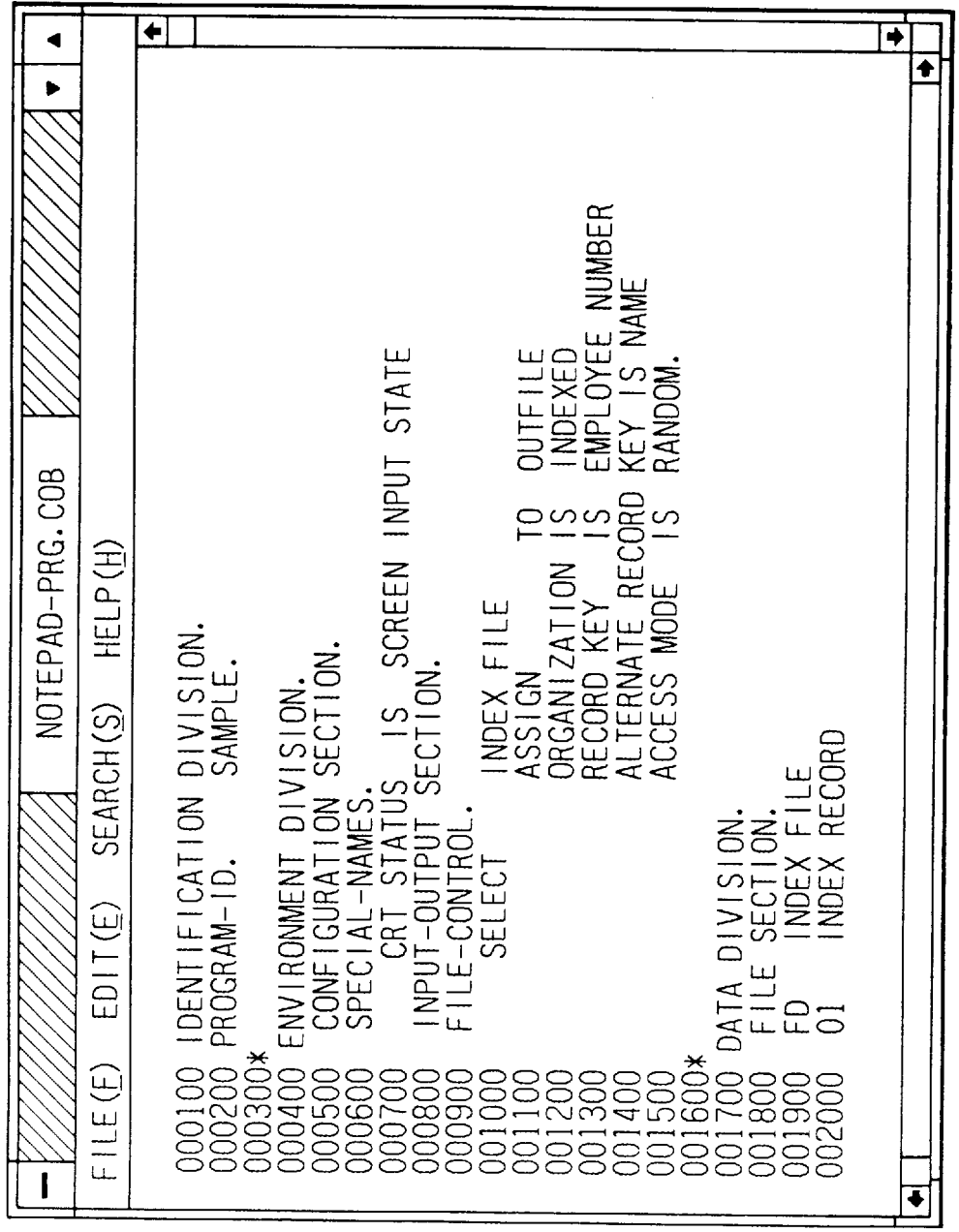
FIG. 18 shows a file opened by a text editor program.

FIG. 18 shows the file PRG.COB opened by the executed text editor program having the file name NOTEPAD.EXE.

(4) Registering an Item

The apparatus of FIG. 2A for displaying work items, displaying a list of file names according to the file list data 36 of a selected one of the items, and executing a program registered for the selected item with a selected one of the file names as a parameter will be explained next. In this example, the item table 30 and item relationship table 40 are combined into a work item table. FIGS. 28A and 28B show examples of the work item table to be explained later in detail.

To add a work item, a work item record must be added to the work item table 170. Procedures of adding a work item record will be explained next with reference to screens of FIGS. 19 to 22.

Figure 19:
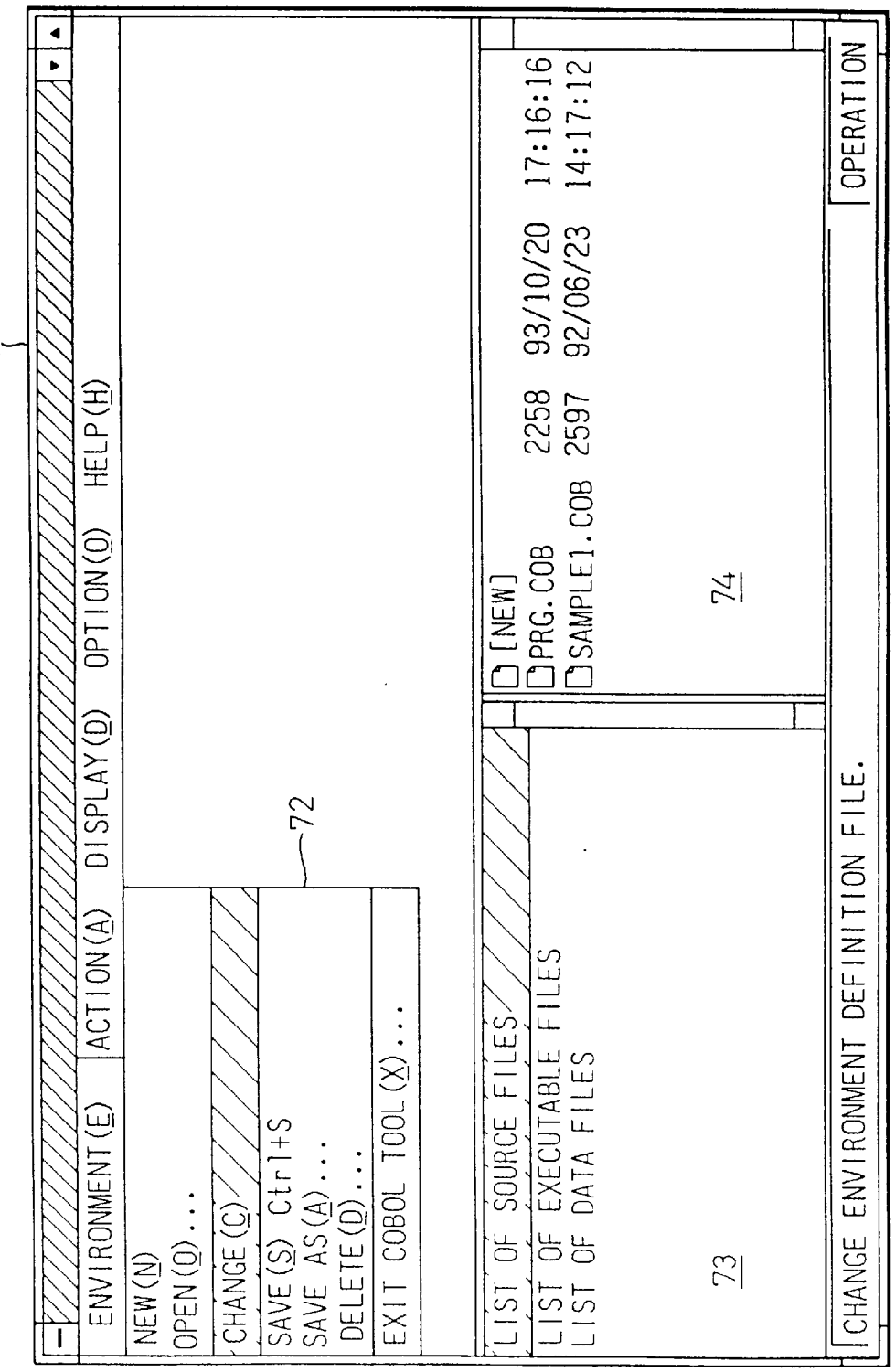
FIG. 19 shows the menu ENVIRONMENT (E) in the operation screen.
Figure 20:
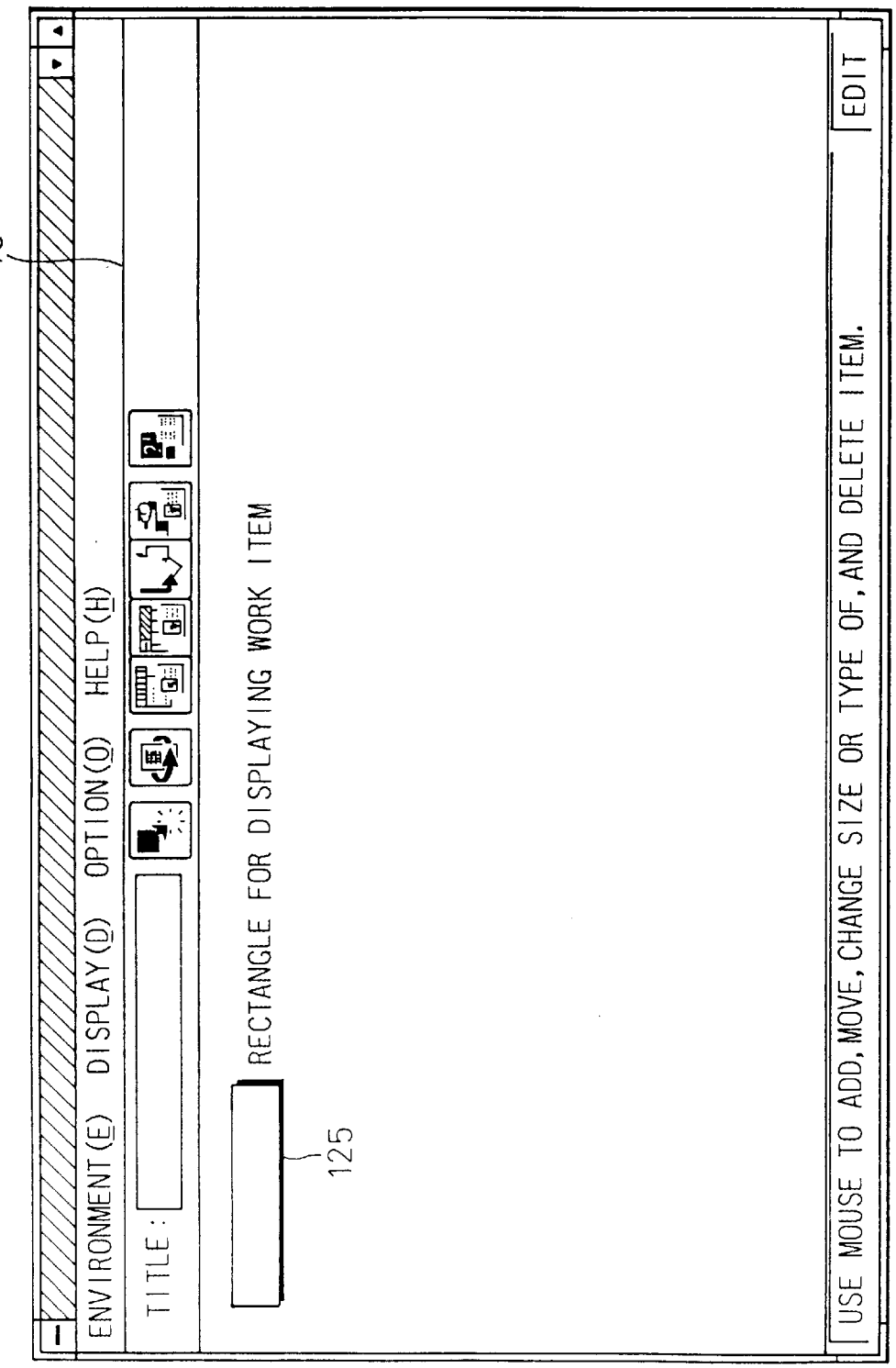
FIG. 20 shows a screen for registering work item data.
Figure 21:
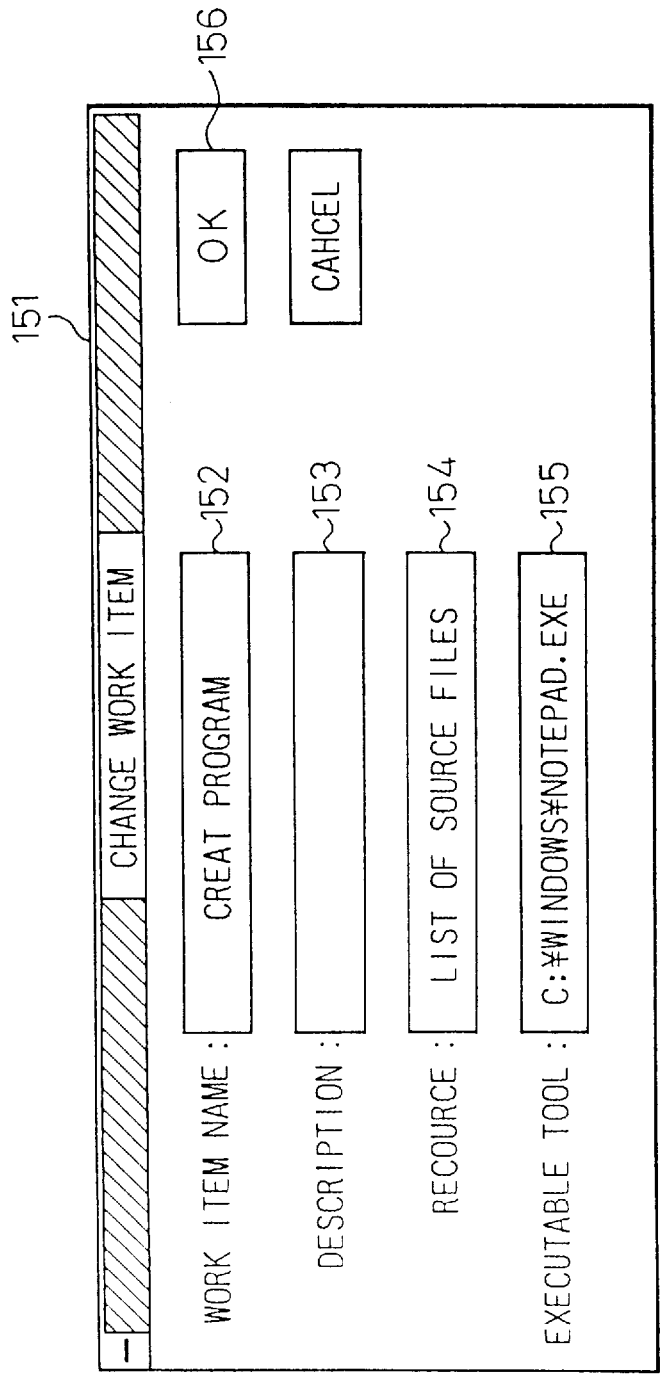
FIG. 21 shows a window for changing work items.

1) FIG. 19 shows the menu ENVIRONMENT (E) 72 pulled down in the operation screen 71, to add program execution data, etc., for a work item. When the CHANGE (C) is selected in the menu ENVIRONMENT (E) 72, the item adding process starts. The window 75 appears in the edit screen as shown in FIG. 20, and the operation mode is changed to the edit mode.

2) The mouse is used to create a shape 125 representing a work item. More precisely, a mouse cursor is positioned at any one of the corners of the shape 125 to be formed. The left button of the mouse is pushed. The mouse cursor is moved to a diagonal corner of the shape, and the mouse button is released. These steps define the shape 125. The item registration section 24 calculates the coordinates of an upper left corner, width, and height of the shape 125 according to coordinates where the left button of the mouse has been pushed and coordinates where the left button has been released. The calculated data are registered as work item display data 171 in the work item table 170 of FIGS. 28A and 28B. According to the data, the shape 125 is displayed.

3) To enter work item data, a user positions the mouse cursor in the shape 125 and pushes the mouse button to select the work item. In response to the pushing of the left button of the mouse, the item registration section 24 collates coordinates where the left button has been pushed with the coordinates, width, height, attribute of the work item display data registered in the work item table 170 and determines whether or not the left button has been pushed inside the shape 125. If it has been pushed outside the shape 125, the process 2) is carried out. If it has been pushed inside the shape 125, a window 151 of FIG. 21 for changing the work item is displayed.

Figure 22:
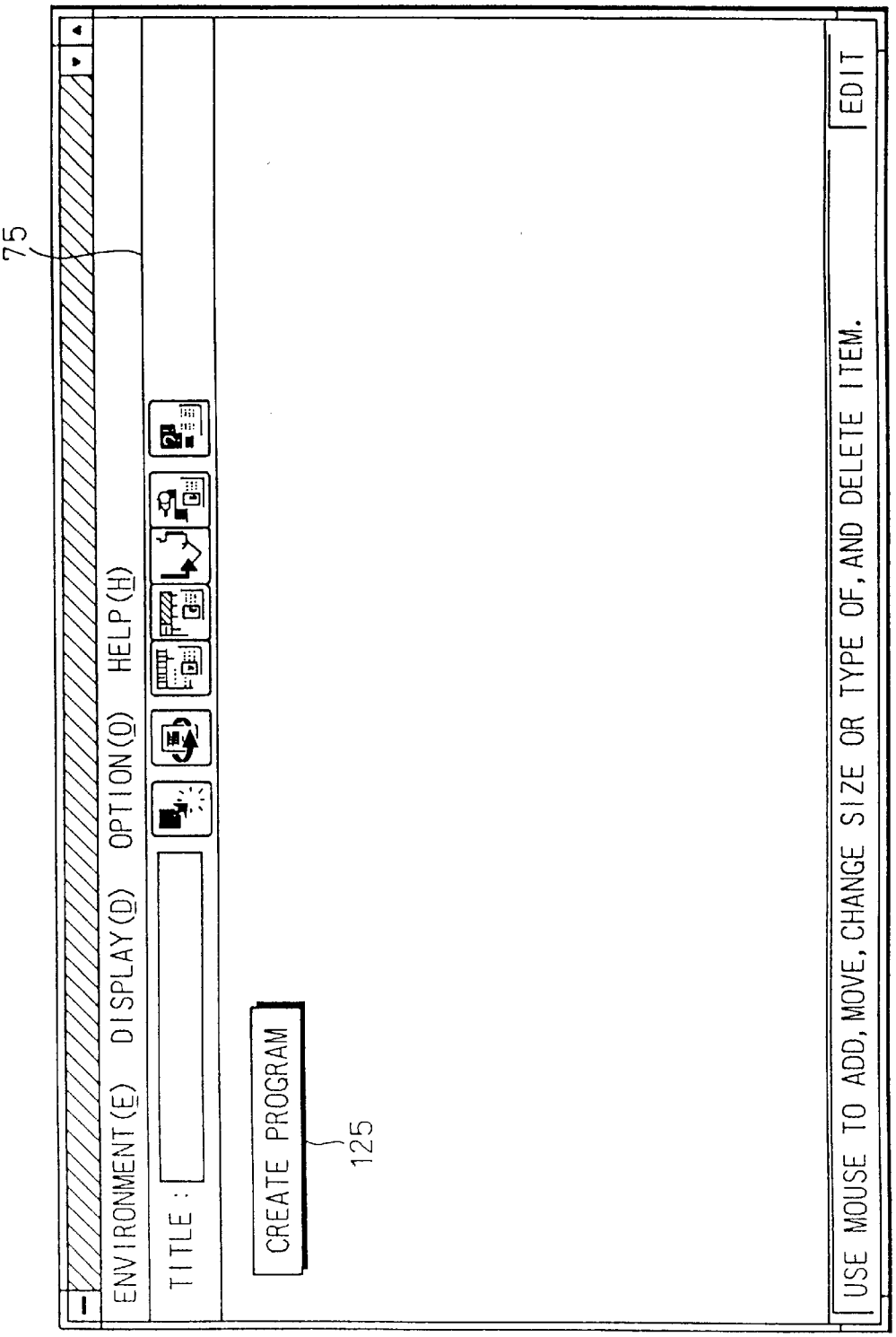
FIG. 22 shows a registered work item.

4) In the window 151, the user enters a work item name in an area 152, a description in an area 153, a corresponding title in a resource area 154, and a directory and a file name for a program to be executed in an executable tool area 155. When the user selects an OK button 156, the window 151 is closed and the window 75 reappears. Through these processes, the entered work item data are registered as work item display data 171 of FIG. 28A, a file list record corresponding to the entered title is retrieved from the file list table; the number of the corresponding file list record is registered as file list link data 172, the entered file name for the executable tool is registered as executable program data 173, and the registered data are displayed as shown in FIG. 22.

5) The above processes may be repeated to register other work items. The shapes representing the work items may be linked with one another with arrow marks and segments, to indicate relationships among the work items.

Displaying the relationships among the work items will be explained next. The mouse is positioned at an end of a segment, the left button of the mouse is pushed and moved to the other end of the segment, and the left button is released. A symbol to be displayed can be changed by pushing the right button of the mouse while pushing the left button thereof, in order of a shape, a first arrow mark A, a second arrow mark B, the shape, the first arrow mark A, and so on. The first arrow mark A horizontally extends from the start thereof and vertically turns toward the end thereof.

The second arrow mark B vertically extends from the start thereof and horizontally turns toward the end thereof.

Figure 23:
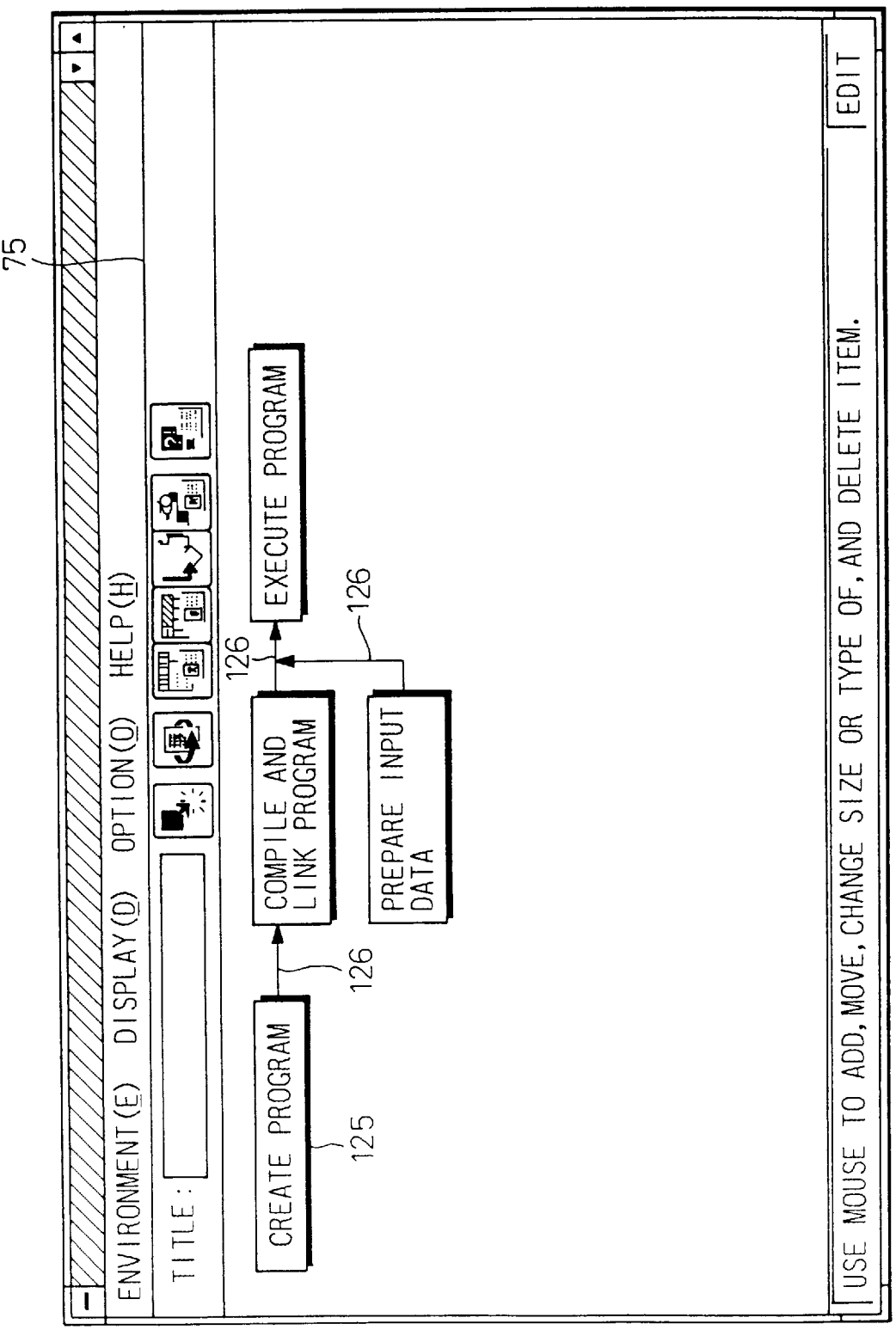
FIG. 23 shows registered work items and relationships among the registered work items.

6) FIG. 23 displays four registered work items CREATE PROGRAM, COMPILE AND LINK PROGRAM, PREPARE INPUT DATA, and EXECUTE PROGRAM. These work items are linked to one another with three arrow marks 126, to register and display their relationships.

7) After completely entering the work item data, the user selects the SAVE (S) in the menu ENVIRONMENT (E) 72, to save the work item data registered in the work item table 170 in a specified file.

(5) Executing a Program on an Item

Figure 24:
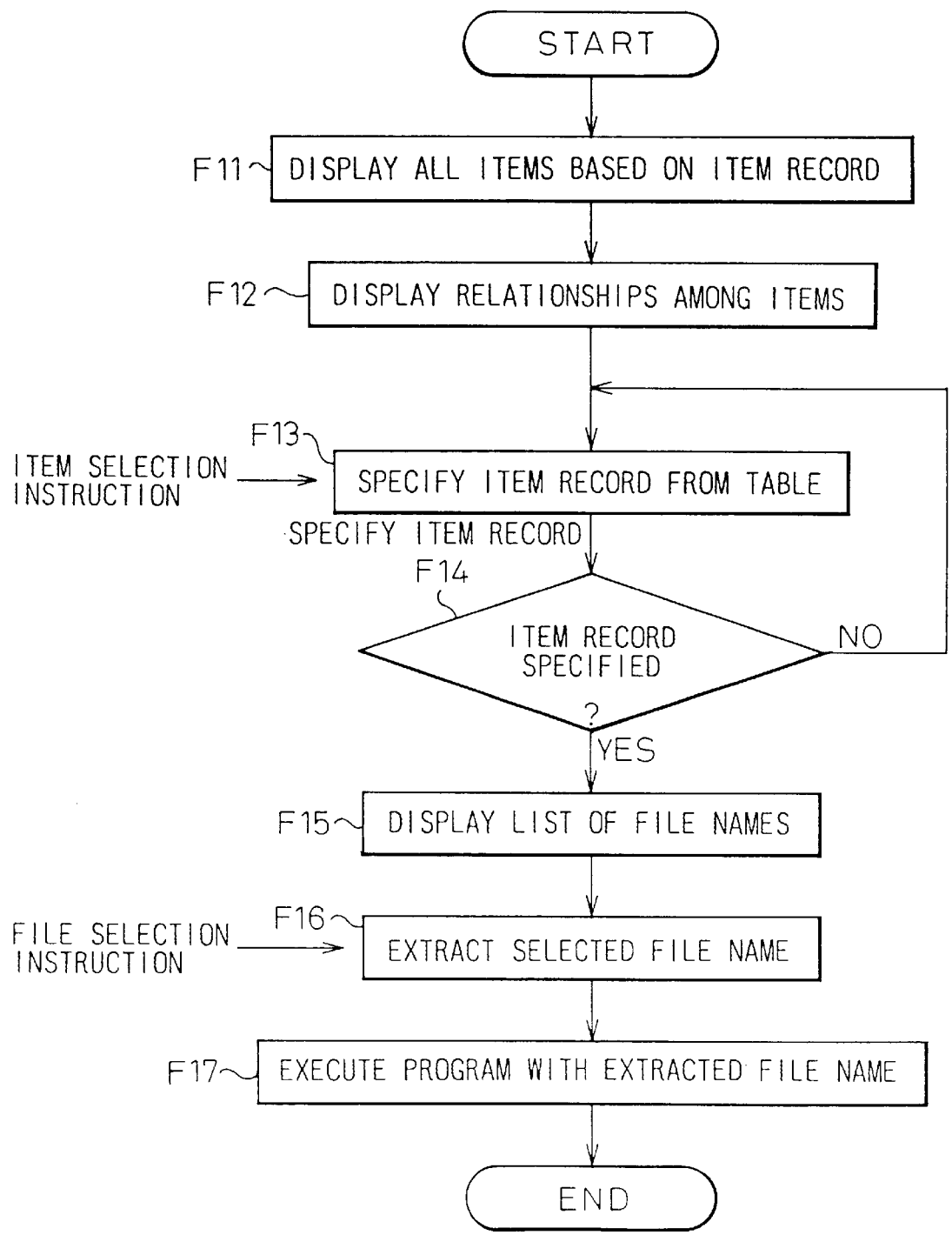
FIG. 24 is a flowchart showing steps of executing a program.
Figure 25:
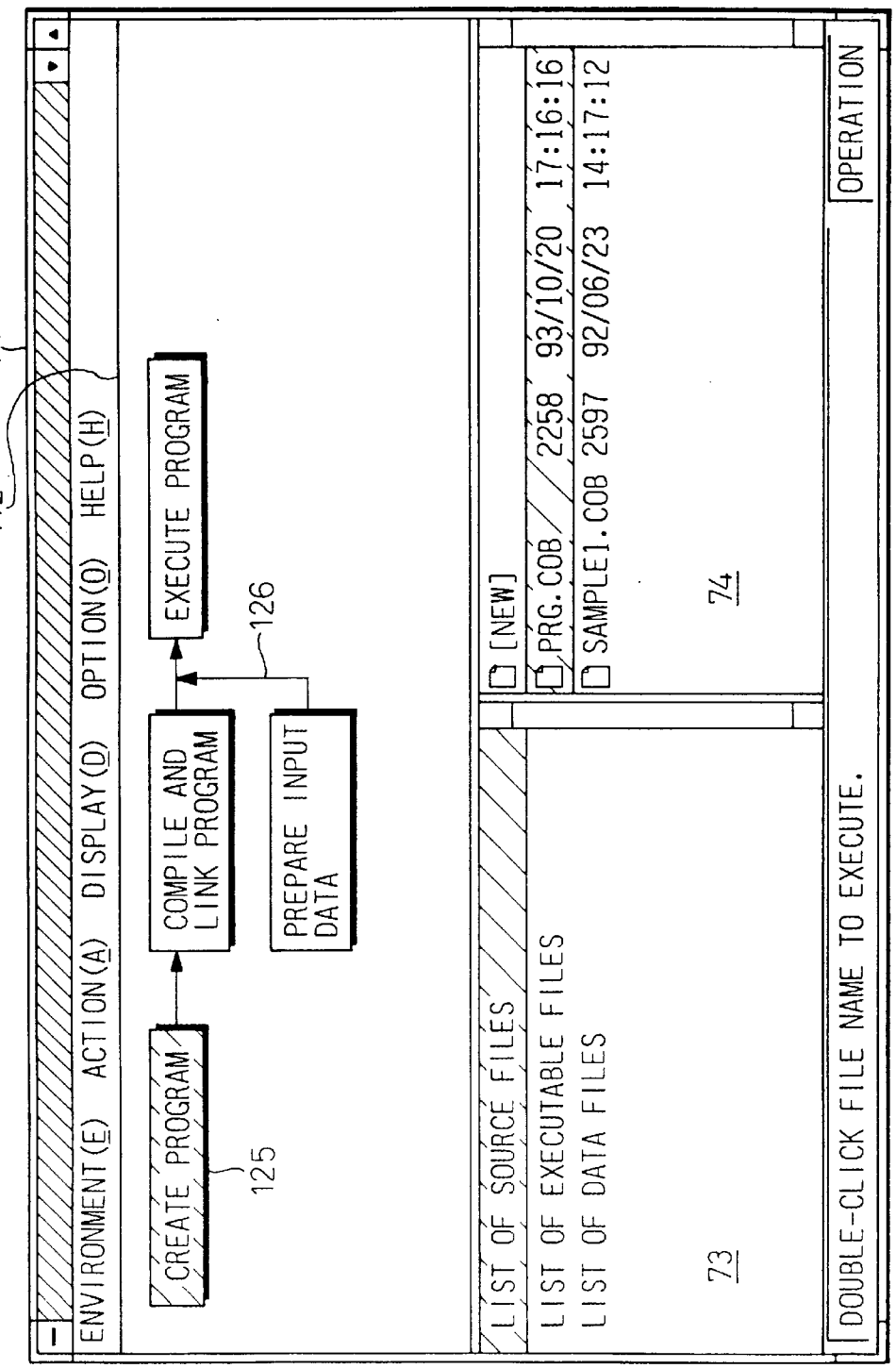
FIG. 25 shows the operation screen when executing a program.

Executing a program according to a registered work item will be explained next with reference to FIGS. 24 and 25. FIG. 24 is a flowchart showing steps carried out by the processing unit 21 of FIG. 2, and FIG. 25 shows the operation screen 71.

Step F11 of FIG. 24 displays items in the window according to the display data 35 of every item records $34_1$–$34_N$ in the item table 30, i.e., the work item table 170. In the item window 112 of FIG. 25, each shape 125 representing a work item is displayed according to the coordinates width, height, and attribute contained in the work item display data 171.

Step F12 displays relationships among the items according to the display data 42 stored in the item relationship table 40. In the window 112 of FIG. 25, the work item relationships are displayed as arrow marks 126.

According to the item selection instruction 11 provided by a user, step F13 finds the coordinates of a mouse pointer and specifies a corresponding one of the item records $34_1$–$34_N$ in the item table 30.

Step F14 determines whether or not the item record $34_1$, for example, has been specified. If YES, step F15 is carried out, and if NO, the flow returns to the step F13. The determination of the step F14 is carried out according to whether or not the left button of the mouse has been pushed in the work item display shape. If the item record $34_1$ has been specified, the corresponding shape is inverted on the display. In FIG. 25, the item CREATE PROGRAM is selected and inverted.

Step F15 displays a list of file names in the window according to the file list data 36 of the specified item record $34_1$. In FIG. 25, the work item CREATE PROGRAM has been selected, the number of the file list is read out of the file list link data 172 of the work item, the title LIST OF SOURCE FILES in the title list window 73 is inverted according to the file list data 36, and a list of corresponding file names is displayed in the file list window 74.

According to the file selection instruction 12 provided by the user, step F16 extracts one of the file names. In FIG. 25, a file PRG.COB is selected and inverted in the file list window 74.

Step F17 combines the selected file name and the program execution data 37 of the specified item record and executes a program. In this example, the file name PRG.COB in a directory C:\MASTER\TEST\SOURCE is specified as an execution parameter of a program having a file name of NOTEPAD.EXE in a directory C:\WINDOWS, and the program is executed. The execution of the program is requested to the operating system in the following format:

C:\WINDOWS\NOTEPAD.EXE C:\MASTER\TEST\SOURCE\PRG.COB

FIGS. 26A and 26B show the file list table 3, in which FIG. 26A shows the structure of the table, and FIG. 26B shows the table with registered data. The title date 32 include displaying order numbers and titles. The file list data 33 include directory names and file extensions. If the LIST OF SOURCE FILES is selected, files controlled under a directory of C:\MASTER\TEST\SOURCE and having an extension of COB are all displayed. These files are retrievable as C:\MASTER\TEST\SOURCE\*.COB, with a wild card. The file list data 33 may include other listing conditions such as file attributes.

FIGS. 27A and 27B show the menu item table 160, in which FIG. 27A shows the structure of the table and FIG. 27B shows the table with registered data. The menu item display data 161 include displaying order numbers, menu items, alphabetic mnemonics, katakana mnemonics, etc. The executable program data 162 include file names of executable programs.

FIGS. 28A and 28B show the work item table 170, in which FIG. 28A shows the structure of the table and FIG. 28B shows the table with registered data. In the table 170, the work item display data 171 include the names, coordinates, widths, heights, etc., of work items. These data correspond to the display data 35 of the item records $34_1$–$34_N$ and the display data 42 of the item relationship records $41_1$–$41_N$ of FIG. 2. The file list link data 172 include the displaying order numbers of the file list records. The data 172 and corresponding entries in the file list table 3 of FIGS. 26A and 26B correspond to the file list data 36 of FIG. 2. The executable program data 173 include file names of executable programs. The data 173 correspond to the program execution data 37 of FIG. 2.

As explained above, a user selects one of the titles displayed in a first window, and then the present invention displays a list of file names in a second window according to file listing conditions corresponding to the selected title. Accordingly, the present invention allows the user to easily retrieve required file names and select one of the files.

The first window displays items and relationships among the items. When the user selects one of the items, the present invention specifies a file list record and program execution data corresponding to the selected item and displays a list of file names in the second window according to listing conditions of the specified file list record. If the user selects one of the file names in the second window, the present invention combines the file name with the program execution data and executes the program. Accordingly, the present invention enables the user to execute a program and specify a file to be handled by the program. The present invention displays even the relationships among the items, so that the user easily executes programs according to work sequences.

While the invention has been illustrated and described in detail and the drawings and foregoing description, it will be recognized that many changes and modifications will occur to those skilled in the art. It is therefore intended, by the appended claims to cover any such changes and modifications as fall within the true spirit and scope of the invention.

I claim:

1. A method for displaying a list of files utilizing a computing device comprising the steps of:

displaying titles on a display according to registered file list records, each including a title and file list data for specifying a group of files, said file list data being expressed by using both a directory path and a wild card expression;

selecting one of the displayed titles;

specifying one of the file list records according to the selected title;

extracting file names according to the one specified file list record; and displaying the extracted file names on the display.

2. The apparatus for displaying the list of files as in claim 1, wherein the computing device further comprises a ROM, and a file storage unit storing registered file list records.

3. An apparatus for displaying a list of files utilizing a computing device comprising:

means for storing registered file list records, each including a title and file list data for specifying a group of files, said file list data being expressed by using both a directory path and a wild card expression;

means for extracting titles out of the file list records and displaying the titles on a display;

means for specifying one of the file list records according to a selected one of the titles; and means for displaying a list of file names on the display according to the specified file list record.

4. An apparatus for executing a program utilizing a computing device comprising:

means for storing file list records, each including file list data for specifying a group of files, said file list data being expressed by using both a directory path and a wild card expression;

means for storing item records, each including an item and file list record identifying data and program execution data that are related to the item;

means for displaying the items on the display;

means for specifying file list data and program execution data according to a selected one of the items;

means for displaying a list of file names on the display according to the specified file list data; and means for combining a selected one of the displayed file names with the program execution data to provide a program execution command, and for executing the program.

5. The apparatus according to claim 4, further comprising means for storing item relationship records for defining relationships among the items, the item displaying means displaying the items stored in the item storage means and relationships among the items.

6. An apparatus for displaying a list of files, comprising:

means for storing file list records, each including a title and file list data for specifying a group of files, said file list data being expressed by using both a directory path and a character string included in file names;

means for extracting titles out of the file list records and displaying the titles on a display;

means for specifying one of the file list records according to a selected title; and means for displaying file names on the display according to the specified file list record.

7. An apparatus for executing a program comprising:

means for storing file list records, each including file list data for specifying a group of files, said file list data being expressed by using both a directory path and a wild card expression;

means for storing item records, each including an item and file list record identifying data and program execution data;

means for displaying the items on the display;

means for specifying file list data and program execution data according to a selected item out of the displayed items;

means for displaying file names on the display according to the specified file list data; and means for combining a selected file name out of the displayed file names with the specified program execution data to provide a program execution command, and for executing the program.

8. An apparatus for executing a program comprising:

means for storing file list records, each including file list data for specifying a group of files, said file list data being expressed by using both a directory path and a character string included in file names;

means for storing item records, each including an item and file list record identifying data and program execution data;

means for displaying the items on the display;

means for specifying file list data and program execution data according to a selected item out of the displayed items;

means for displaying file names on the display according to the specified file list data; and means for combining a selected file name out of the displayed file names with the specified program execution data to provide a program execution command, and for executing the program.

9. An apparatus for executing a program comprising:

means for storing file list records, each including file list data for specifying a group of files, said file list data being expressed by using both a directory path and a character string included in file names;

means for storing item records, each including an item and file list record identifying data and program execution data;

means for displaying the items on the display;

means for selecting one of the displayed items;

means for specifying file list data and program execution data according to the selected item;

means for displaying file names on the display according to the specified file list data; and means for selecting one of the displayed file names;

means for combining the selected file name with the specified program execution data to provide a program execution command, and for executing the program.

10. An apparatus for executing a program, comprising:

means for storing file list records, each including file list data for specifying a group of files, said file list data being expressed by using both a directory path and a wild card expression;

means for storing item records, each including an item name, file list record identifying information for identifying one of said file list records and program execution data;

means for displaying the items on the display;

means for selecting an item among the displayed items;

means for specifying one of said file list records corresponding to the selected item;

means for displaying file names on the display according to the specified file list record;

means for selecting a file name out of the displayed file names;

means for combining the selected file name with the program execution data corresponding to the selected item to provide a program execution command, and for executing the program.

* * * * *

UNITED STATES PATENT AND TRADEMARK OFFICE
CERTIFICATE OF CORRECTION

PATENT NO.: 5,832,471
DATED : November 3, 1998
INVENTOR(S): Toshihiro FUKUI

It is certified that error appears in the above-identified patent and that said Letters Patent is hereby corrected as shown below:

On the title page, [54], line 3, delete "A".

On the title page, [56], insert the following section:

FOREIGN PATENT DOCUMENTS

0410210A2      01/1991      EPO

Col. 1, line 3, delete "A".

Signed and Sealed this

Twentieth Day of April, 1999

Attest:

Q. TODD DICKINSON

*Attesting Officer*    *Acting Commissioner of Patents and Trademarks*